US012533401B2

(12) United States Patent
Singh

(10) Patent No.: US 12,533,401 B2
(45) Date of Patent: *Jan. 27, 2026

(54) DEVICES AND METHODS FOR MODULATING ADMA IN BLOOD

(71) Applicant: THE TRUSTEES OF INDIANA UNIVERSITY, Bloomington, IN (US)

(72) Inventor: Jaipal Singh, Carmel, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 765 days.

This patent is subject to a terminal disclaimer.

(21) Appl. No.: 17/642,011

(22) PCT Filed: Sep. 10, 2020

(86) PCT No.: PCT/US2020/050158
§ 371 (c)(1),
(2) Date: Mar. 10, 2022

(87) PCT Pub. No.: WO2021/050695
PCT Pub. Date: Mar. 18, 2021

(65) Prior Publication Data
US 2022/0409707 A1    Dec. 29, 2022

Related U.S. Application Data

(60) Provisional application No. 62/899,763, filed on Sep. 13, 2019.

(51) Int. Cl.
A61K 38/50    (2006.01)
A61K 47/69    (2017.01)
A61M 1/34     (2006.01)
A61M 60/113   (2021.01)
A61M 60/36    (2021.01)
A61P 9/12     (2006.01)

(52) U.S. Cl.
CPC .......... A61K 38/50 (2013.01); A61K 47/6921 (2017.08); A61M 1/3486 (2014.02); A61M 60/113 (2021.01); A61M 60/36 (2021.01); A61P 9/12 (2018.01)

(58) Field of Classification Search
None
See application file for complete search history.

(56) References Cited

U.S. PATENT DOCUMENTS

| 12,227,779 B2 * | 2/2025 | Singh |
| 2005/0153315 A1 | 7/2005 | Vallance et al. |
| 2005/0176060 A1 | 8/2005 | McDonald et al. |
| 2007/0207952 A1 | 9/2007 | Silva et al. |
| 2008/0108557 A1 | 5/2008 | Behrens et al. |
| 2011/0065633 A1 | 3/2011 | Di Marchi et al. |
| 2012/0220011 A1 | 8/2012 | Schellenberger et al. |
| 2012/0237503 A1 | 9/2012 | Mookerjee |
| 2013/0102948 A1 | 4/2013 | Reich |
| 2015/0121808 A1 | 5/2015 | Gaitas |
| 2016/0151555 A1 | 6/2016 | Bluchel et al. |
| 2017/0056576 A1 | 3/2017 | Doyle et al. |
| 2022/0204961 A1 | 6/2022 | Singh |

FOREIGN PATENT DOCUMENTS

| CN | 102628868 A | 8/2012 |
| CN | 102628868 B | 8/2012 |
| JP | S605167 | 1/1985 |
| JP | 2001524839 | 12/2001 |
| JP | 2015516264 | 6/2015 |
| JP | 2017528253 | 9/2017 |
| WO | 00/44888 A2 | 8/2000 |
| WO | 03/089638 A1 | 10/2003 |
| WO | 2006/007400 A2 | 1/2006 |
| WO | 2019/028040 A1 | 2/2019 |
| WO | 2019136289 A1 | 7/2019 |
| WO | 2021018758 A1 | 2/2021 |

OTHER PUBLICATIONS

PCT International Search Report and Written Opinion completed by the ISA/US on Nov. 17, 2020 and issued in connection with PCT/US2020/050158.
Veronese FM et al: "PEGylation, successful approach to drug delivery", Drug Discovery Today, Elsevier, Amsterdam, NL, vol. 10, No. 21, Nov. 1, 2005.
Extended European Search Report, EP 18842346.1, Aug. 19, 2021.
Sharma et al. "Tumor-targeted delivery of siRNA using fatty acyl-CGKRK peptide conjugates," Scientific Reports, Jul. 21, 2017 (Jul. 21, 2017), vol. 7, pp. 1-14.
Pang et al. "A modular method for high yield synthesis of site-specific protein-polymer therapeutics," Angewandte Chemie International Edition English, Jul. 21, 2016 (Jul. 21, 2016), vol. 55, No. 35, pp. 10296-10300.

(Continued)

Primary Examiner — Brad Duffy
(74) Attorney, Agent, or Firm — Barnes & Thornburg LLP

(57) ABSTRACT

Compositions and methods are provided for metabolically degrading ADMA. In one embodiment a device is provided for reducing a patients ADMA levels in their blood wherein the device comprises a biologically active dimethylarginine dimethylaminohydrolase (DDAH) polypeptide covalently linked to a solid support. In one embodiment a method for reducing ADMA levels in a patients blood comprises the step of contacting the patients blood or a blood fraction with an immobilized biologically active DDAH polypeptide, wherein contact of the patients blood with said DDAH polypeptide results in degradation of ADMA present in the patients blood.

8 Claims, 3 Drawing Sheets
Specification includes a Sequence Listing.

(56) References Cited

OTHER PUBLICATIONS

Frey et al. "Structure of the Mammalian NOS Regulator Dimethylarginine Dimethylaminohydrolase: A Basis for the Design of Specific Inhibitors," Structure, May 31, 2006 (May 31, 2006), vol. 14, Iss. 5, pp. 901-911.
Stone et al., "Characterization of a Transient Covalent Adduct Formed during Dimethylarginine Dimethylaminohydrolase Catalysis", Biochemistry 2005, 44, 7069-7078.
Ghebremariam et al., "An Unexpected Effect of Proton Pump Inhibitors: Elevation of the Cardiovascular Risk Factor ADMA", Circulation. Aug. 20, 2013; 128(8): . doi:10.1161/CIRCULATIONAHA. 113.003602.
Kimoto et al., "Purification, cDNA cloning and expression of human NG,NG-dimethylarginine", Eur. J. Biochem., vol. 258, pp. 863-868 (1998).
Ghebremariam et al., "Development of a dimethylarginine dimethylaminohydrolase (DDAH) assay for high throughput chemical screening", J. Biomol. Screen., 2012, 17(5): 651-661, doi: 10.1177/1087057112441521.
Murray-Rust et al., "Structural insights into the hydrolysis of cellular nitric oxide synthase inhibitors by dimethylarginine", Nature Structural Biology, 2001, vol. 8, No. 8, pp. 679-683.
Freitas et al., "Tag-mediated single-step purification and immobilization of recombinant proteins toward protein-engineered advanced materials", Journal of Advanced Research, 2022, vol. 36, pp. 249-264.
CM5 Sensor Chip Information Data Sheet. Retrieved from < https://www.cytivalifesciences.com/en/us/shop/protein-analysis/spr-label-free-analysis/spr-consumables/spr-sensor-chips/sensor-chip-cm5-p-05858 > May 19, 2023.
Mariani, S. and Minunni, Me, "Surface plasmon resonance applications in clinical analysis" Anal Bioanal Chem (2014) 406:2303-2323, DOI 10.1007/s00216-014-7647-5.
Arvedson et al., "Design Rationale and Development Approach for Pegfilgrastim as a Long-Acting Granulocyte Colony-Stimulating Factor", BioDrugs, 2015, vol. 29, pp. 185-198.
Caliceti et al., Advanced Drug Delivery Reviews, vol. 55, pp. 1261-1277 (2003). (Year: 2003).
Gamez et al., "Toward PKU Enzyme Replacement Therapy: PEGylation with Activity Retention for Three Forms of Recombinant Phenylalanine Hydroxylase", Molecular Therapy, 2004, vol. 9, No. 1, pp. 124-129.
Hennig et al., "Nanoparticle multivalency counterbalances the ligand affinity loss upon PEGylation." Journal of controlled release: official journal of the Controlled Release Society vol. 194 (2014): 20-7 (Abstract only).
Kling, J. , "PEGylation of Biologics", 2013, in BioProcess International. Retrieved from < https://bioprocessintl.com/upstream-processing/biochemicals-raw-materials/pegylation-of-biologics-340623/ > on Apr. 13, 2023.
Kopecky et al., "Effect of oriented or random PEGylation on bioactivity of a factor VIII inhibitor blocking peptide." Biotechnology and bioengineering vol. 93,4 (2006): 647-55 (Abstract only).
Kimple et al., "A capture coupling method for the covalent immobilization of hexahistidine tagged proteins for surface plasmon resonance", Methods Mol Biol. 2010; 627: 91-100. doi: 10.1007/978-1-60761-670-2_5.
Mayolo-Deloisa et al., "Aldehyde PEGylation of laccase from Trametes versicolor in route to increase its stability: effect on enzymatic activity." Journal of molecular recognition: JMR vol. 28,3 (2015): 173-9 (abstract only).
Nischan et al., "Site-specific PEGylation of proteins: recent developments." The Journal of organic chemistry col. 79,22 (2014): 10727-33 (Abstract only).
Roberts et al., "Chemistry for peptide and protein PEGylation," Ad. Drug Delivery Reviews, 2002, vol. 54, pp. 459-476.
Zaghmi et al., "Mechanisms of activity loss for a multi-PEGylated protein by experiment and simulation." Materials Today Chemistry, vol. 12, 2019, pp. 121-131 (abstract only).
Young Lee, et al. "A Therapeutic Extracorporeal Device for Specific Removal of Pathologic Asymmetric Dimethylarginine from the Blood" Blood Purif 2022;51 :889-898; Mar. 4, 2022 (10 pages).
Elena Oliva-Damaso et al. "Asymmetric (ADMA) and Symmetric (SOMA) Dimethylarginines in Chronic Kidney Disease: A Clinical Approach" Int. J. Mol. Sci. 2019, 20, 3668; doi: 10.3390/ijms20153668 (15 pages).
European Search Report for counterpart European Application 20863553.2-1111 / 4028071 PCT/US202005015, dated Feb. 13, 2024 (11 pages).
Aggrawal et al., "Dimethylarginine Dimethylaminohydrolase II Overexpression Attenuates LPS-Mediated Lung Leak in Acute Lung Injury", American Journal of Respiratory Cell and Molecular Biology, 2014, vol. 50, No. 3, pp. 614-625. And 13 pages of Supplemental Data, E1-E13.
Boger, R.H., "Asymmetric dimethylarginine (ADMA): A novel risk marker in cardiovascular medicine and beyond", Annals of Medicine, 2006, vol. 38, No. 2, 126-136, DOI: 10. (1080/07853890500472151.
Examination Report for copending European patent application No. 18842346.1, mailed Nov. 25, 2024.
International search report prepared for application No. PCT/U82018/044627, mailed Jan. 9, 2019.
Leader et al., "Protein therapeutics: a summary and pharmacological classification", Nature Review, Drug Discovery, Jan. 2008, vol. 7, pp. 21-39.
Abe et al., "The Blood Compatabilities of Blood Purification Membranes and Other Materials Developed in Japan", International Journal of Biomaterials, 2011, vol. 2011, pp. 1-9, DOI: 10.1155/2011/375390.
Japanese Office Action for patent application No. 2022-516043, issued Mar. 3, 2025.
Japanese Office Action for patent application No. 2022-516043, issued Jun. 24, 2025.

* cited by examiner

DEVICES AND METHODS FOR MODULATING ADMA IN BLOOD

CROSS REFERENCE TO RELATED APPLICATIONS

This application is a US national counterpart application of international application serial no. PCT/US2020/050158 filed Sep. 10, 2020, which claims priority to the following: U.S. Provisional Patent Application No. 62/899,763 filed on Sep. 13, 2019, the disclosure of which is expressly incorporated herein.

INCORPORATION BY REFERENCE OF MATERIAL SUBMITTED ELECTRONICALLY

Incorporated by reference in its entirety is a computer-readable nucleotide/amino acid sequence listing submitted concurrently herewith and identified as follows: 32 kilobytes ACII (Text) file named "320861SeqListing_ST25.txt," created on Sep. 6, 2020.

BACKGROUND OF THE DISCLOSURE

Asymmetric dimethylarginine (ADMA), an analogue of L-arginine, is a naturally occurring product of metabolism found in human circulation. Elevated blood levels of ADMA occur in disease states including, hypertension, preeclampsia, diabetes, kidney disease, end-stage renal disease (ESRD), or chronic kidney failure and heart failure. High ADMA levels are also generated in patients undergoing cardiac bypass surgery, heart valve replacement, sepsis and in ICU patients. A major cause of cardiovascular mortality in dialysis patients is linked to the high levels of circulating cardiotoxins that are not efficiently cleared by the dialysis system. In particular, the dialysis system does not clear the protein bound uraemic toxins.

The uraemic toxin ADMA is strongly linked to cardiovascular disease and mortality. ADMA accumulates substantially in the blood of patients with chronic kidney disease (CKD) receiving dialysis. Because ADMA in blood is bound to proteins, it is therefore not effectively reduced during dialysis. Plasma levels of ADMA are associated with progression to dialysis and death. In studies it was shown that plasma concentration of ADMA predicted mortality in patients with ESRD, and predicted cardiovascular events and mortality in populations at high, intermediate or low global vascular risk. In patients with end-stage renal disease, elevated ADMA levels are associated with carotid atherosclerosis and cardiovascular mortality.

Infusion of ADMA decreased the effective renal plasma flow. Moreover, plasma ADMA in elderly subjects was an independent predictor of reduced effective renal plasma flow and increased renovascular resistance. Accumulation of ADMA can also contribute to high blood pressure in patients with chronic renal failure.

Preeclampsia is a leading cause of maternal and fetal mortality and morbidity involving 5-10% of all pregnancies, and accounting for more than 50,000 pregnancy-related deaths per year worldwide. It is widely recognized that nitric oxide (NO) plays an important role in the vascular pathogenesis of preeclampsia as NO bioavailability is diminished in preeclampsia patients. NO is a critical molecule for maternal and fetal vascular health, placental blood flow, angiogenesis, trophoblast invasion and implantation. Impairment of NO causes vasoconstriction, platelet aggregation, vascular inflammation, and mitochondrial dysfunction leading to renal dysfunction, proteinuria, and cardiovascular disease.

Abnormally high levels of ADMA circulate in the blood of preeclampsia patients. Meta-analysis of 11 studies with 1338 pregnant women showed that as early as 20 weeks of gestation, the circulating levels of ADMA were significantly higher in women who subsequently developed preeclampsia as compared with those did not. The increase in ADMA preceding the onset of preeclampsia suggests its potential role in the pathogenesis of preeclampsia. Similar conclusions were reached by another study with 631 preeclampsia and 498 health pregnant women.

In addition, when ADMA levels in the body rise, it can reduce nitric oxide (NO) generation and thereby contributing to vascular dysfunction. Deficiency of NO leads to vasoconstriction, pro-inflammatory and prothrombogenic state promoting cardiovascular disease. More particularly, impaired NO bioavailability contributes to reduced glomerular blood flow, increased vascular resistance of the afferent and efferent arterioles, reduced ultrafiltration, renal blood flow and glomerular filtration rate (GFR), decreased secretion of renin, a hormone involved in the sodium and water balance in the body, reduced ability to excrete sodium under normal conditions, increased blood pressure and deterioration in renal function. High ADMA levels in ESRD patients are inversely related to GFR and positively correlated to progression to ESRD and mortality due to cardiovascular complications. Further, dysfunctional NO pathway leads to production of oxygen reactive species directly involved in organ damage.

A variety of experimental and clinical studies have established that ADMA is an inhibitor of nitric oxide synthesis. High level of ADMA plays a pathogenic role by acting as a competitive inhibitor for nitric oxide generation by nitric oxide synthase (NOS). By binding to the cationic amino acid transporter, it inhibits arginine transport. Deficiency of NO production is associated with a wide range of vascular diseases including, hypertension, pulmonary arterial hypertension, erectile dysfunction, acute and chronic heart failure, atrial fibrillation, sickle cell disease and sepsis, wound healing, Further, ADMA may have an even greater role in attenuating NOS activity in pathological conditions in which arginine concentration is reduced as observed in patients with coronary artery disease, hypertension, kidney disease, diabetes, obesity.

By reducing NO bioavailability, high levels of ADMA can promote vascular dysfunction, vasoconstriction, pro-inflammatory and prothrombogenic state. In addition, high levels of ADMA can uncouple NOS thereby causing it to produce oxygen free radical formation and organ damage. Since vascular homeostasis plays a fundamental role in normal physiology and survival, a persistent dysfunction of vascular endothelium can lead to a variety of disease states and death.

Dimethylarginine dimethylaminohydrolase (DDAH) is an enzyme found in all mammalian cells. The enzyme degrades methylarginines, specifically asymmetric dimethylarginine (ADMA) and NG-monomethyl-L-arginine (MMA). In disease states where DDAH expression or activity is impaired, ADMA clearance is reduced leading to its accumulation in tissues and blood. For example, in pathological conditions such as diabetes, atherosclerosis or inflammation DDAH-1 gene expression is reduced and ADMA is increased. Under oxidative stress, as observed following ischemia-reperfusion, oxidation of active site cysteine 249 has been shown to inactivate DDAH activity. In lung disease such as pulmonary arterial hypertension (PAH), DDAH mRNA and protein expression are reduced and ADMA levels are increased. Therefore, methods that can increase enzyme levels in the body would reduce ADMA and produce therapeutic benefit in prevention or treatment of disease.

Two isoforms of DDAH are encoded by separate genes located on human chromosome 1 (DDAH-1) and 6 (DDAH-2). The two proteins share 63% amino acid homology but exhibit similar catalytic properties. Both enzymes metabolize ADMA into citrulline and dimethylamine DDAH can hydrolyze both the NG-monomethyl-1-arginine (1-NMMA) and ADMA, therefore DDAH can reduce the inhibitory concentrations of the methylamines and allow more NO generation.

On aspect of the present disclosure relates to the synthesis and use of immobilized enzyme dimethylarginine diaminohydrolase (DDAH) or an analog or biologically active fragment of the DDAH enzyme, where the DDAH analog or fragment thereof is capable of hydrolyzing asymmetric dimethylarginine (ADMA) to citrulline and/or other breakdown products of ADMA. A cDNA encoding DDAH protein has been made and used to express and produce recombinant biologically active DDAH protein and has been covalently linked to a solid support.

The immobilized DDAH, or biologically active fragment thereof, is then used in accordance with the present disclosure by placing it in contact with blood or plasma or tissues of a patient to lower plasma levels of ADMA. DDAH or analogs thereof can be particularly effective to reduce ADMA when utilized in conjunction with or as a part of hemodialysis system components or plasmapheresis to extracorporeally treat a patient's blood to reduce levels of ADMA.

SUMMARY

In accordance with one embodiment of the present disclosure, compositions and methods are provided for degrading asymmetric dimethylarginine (ADMA). More particularly, one aspect of the present disclosure is directed to methods of reducing ADMA in patients in need of such treatment. In accordance with one embodiment ADMA levels are reduced by contacting ADMA with the enzyme dimethylarginine dimethylaminohydrolase (DDAH) under conditions suitable for degradation of ADMA by DDAH.

In accordance with one embodiment a device is provided comprising a biologically active dimethylarginine dimethylaminohydrolase (DDAH) polypeptide covalently linked to a solid support. In accordance with one embodiment the DDAH is covalently linked to the solid support via an acylation reaction between a functionalized group on the solid support and a carboxylic acid of DDAH. In one embodiment the DDAH polypeptide is covalently linked to the solid support surface via the C-terminal carboxy acid of DDAH to form an amide linkage. In one embodiment the surface of the solid support is functionalized with an N-hydroxy succinamide group and the DDAH polypeptide is conjugated to a solid support via an amino group of DDAH or via a spacer. In another embodiment DDAH may be linked to the solid support by its carboxy groups.

In accordance with one embodiment a device is provided comprising a biologically active dimethylarginine dimethylaminohydrolase (DDAH) polypeptide covalently linked to a solid support, wherein the solid support is comprised of a synthetic polymer. The solid support may be any insoluble material and can be formed as particulate (e.g., a plurality of beads) or as a monolithic strip or sheet of insoluble material. In one embodiment the solid support is porous and the DDAH polypeptide is immobilized on the surface of the solid support throughout the external and internal spaces of the solid support. In accordance with one embodiment the solid support comprises a matrix of insoluble materials wherein the DDAH polypeptide is covalently linked to the matrix scaffold.

The DDAH polypeptide can be any known polypeptide or variant thereof that is capable of metabolizing ADMA to citrulline and dimethylamine. Any of the DDAH polypeptides known to those skilled in the art can be used in accordance with the present disclosure including for example a DDAH polypeptide selected from the group consisting of a human DDAH polypeptide, a bovine DDAH polypeptide, a murine DDAH polypeptide, a rat DDAH polypeptide, a bacterial polypeptide and a non-human primate DDAH polypeptide. In accordance with one embodiment one or more biologically active DDAH polypeptides, having at least 75%, 80%, 85%, 90%, 95% or 99% sequence identity to SEQ ID NO: 1 or SEQ ID NO:2, SEQ ID NO:5, SEQ ID NO 6, SEQ ID NO 7, SEQ ID NO 9, SEQ ID NO 10, SEQ ID NO 11, SEQ ID NO 12, SEQ ID NO 13 or SEQ ID NO 14 are covalently linked to a solid support. In one embodiment the DDAH polypeptide comprises an amino acid sequence having at least 95% sequence identity to an amino acid sequence selected from the group consisting of SEQ ID NO: 1, SEQ ID NO: 2, SEQ ID NO: 5, SEQ ID NO: 6, SEQ ID NO: 7, SEQ ID NO: 9, SEQ ID NO: 10, SEQ ID NO: 11, SEQ ID NO: 12, SEQ ID NO: 13, and SEQ ID NO: 14. In one embodiment the DDAH polypeptide comprises an amino acid sequence of SEQ ID NO: 1, SEQ ID NO: 2, or an amino acid sequence having at least 95% sequence identity to SEQ ID NO: 1, or SEQ ID NO: 2. In one embodiment the DDAH polypeptide comprises an amino acid sequence of SEQ ID NO: 1 or SEQ ID NO: 2. In one embodiment the DDAH polypeptide comprises an amino acid sequence of SEQ ID NO: 1. In one embodiment the DDAH polypeptide comprises an amino acid sequence of SEQ ID NO: 2. In one embodiment the DDAH polypeptide comprises an amino acid sequence of SEQ ID NO: 13.

In one embodiment a blood treatment device is provided comprising an arterial line; a blood pump; a blood treatment unit; and a venous line, wherein the arterial and venous lines can be connected to a blood vessel of a patient to form an extracorporeal blood circuit, wherein the blood treatment unit comprises a biologically active dimethylarginine dimethylaminohydrolase (DDAH) polypeptide covalently linked to a solid support. Accordingly, when an extracorporeal blood circuit is formed using the device, the patient's blood flows through the blood treatment device and contacts said DDAH polypeptide before being returned to the patient.

The immobilized DDAH constructs of the present disclosure can be used as a component of a larger extracorporeal device that directs the flow of blood into contact with the DDAH immobilized on the solid support. In one embodiment an extracorporeal blood treatment system is provided comprising means for withdrawing blood from a human patient; means for transporting the withdrawn blood through a device, the device comprising: a biologically active dimethylarginine dimethylaminohydrolase (DDAH) polypeptide; and, a substrate in the device, where the biologically active DDAH polypeptide is immobilized on the substrate and where the biologically active DDAH polypeptide degrades asymmetric dimethylarginine (ADMA) in the blood; and, means for returning treated blood back to the human patient. In one embodiment an extracorporeal device is provided comprising a housing defining a chamber; a blood treatment unit located within said housing, an arterial line and venous line and a blood pump, wherein the arterial line and venous line are in fluid communication with the chamber and the blood treatment unit, wherein the blood treatment unit comprises a biologically active dimethylarginine dimethylaminohydrolase (DDAH) polypeptide covalently linked to a solid support and the blood pump moves blood through the blood treatment unit. In accordance with one embodiment the arterial line of the extracorporeal device is placed in fluid communication with an arterial vessel of a patient and the venous line of the extracorporeal device is placed in fluid communication with a venous vessel of a patient and the blood pump assists with moving the blood from the patient through the blood treatment unit and back to the patient's blood stream via the venous line.

In one embodiment the blood treatment units of the extracorporeal devices of the present disclosure comprise a solid support that is a bead, a monolithic strip or sheet, optionally wherein the solid support is porous, wherein the DDAH is covalently linked to the surface of the solid support.

In accordance with one embodiment a method of reducing ADMA levels in a patient's blood is provided. In one embodiment the ADMA levels are reduced by contacting a patient's blood or a blood fraction, including for example a dialysate or blood plasma after plasmapheresis with DDAH under conditions wherein the DDAH metabolizes ADMA to citrulline and dimethylamine. In one embodiment the DDAH is immobilized on a solid support and a patient's blood or blood fraction is placed in contact with the immobilized DDAH under conditions wherein the DDAH metabolizes ADMA to citrulline and dimethylamine. In one embodiment the step of contacting a patient's blood or blood fraction with the an immobilized biologically active DDAH polypeptide takes place ex vivo, and said blood and/or blood fraction is returned to the patient after contact with said DDAH polypeptide. In one embodiment the patient's blood or blood fraction is passed through a device comprising a biologically active dimethylarginine dimethylaminohydrolase (DDAH) polypeptide covalently linked to a solid support, wherein the blood or blood fraction comes in contact with the biologically active DDAH polypeptide before the blood or blood faction is returned to the patient. In one embodiment the solid support is porous and the DDAH polypeptide is immobilized on the surface of the solid support throughout the external an internal spaces of the solid support.

DETAILED DESCRIPTION

Definitions

Figure 1:
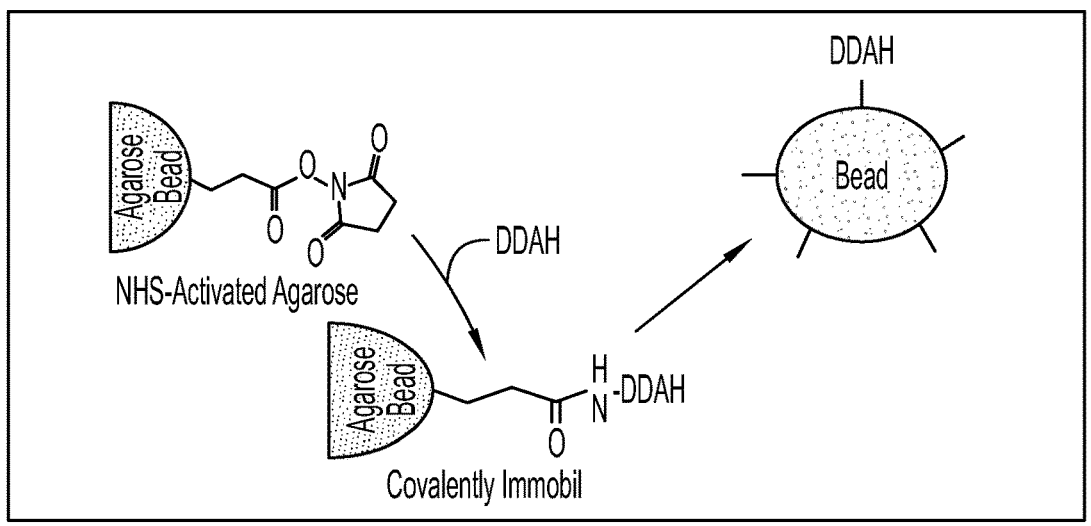
FIG. 1 Generation of DDAH conjugated matrix. DDAH conjugation to matrix was achieved by incubation of N-hydroxy succinamide functionalized beads with 1 mg/ml DDAH for 1 hour at room temperature. Beads were then washed with saline or 10 mM Tris buffer. DDAH-conjugated beads were stored at 4 C.
Figure 2:
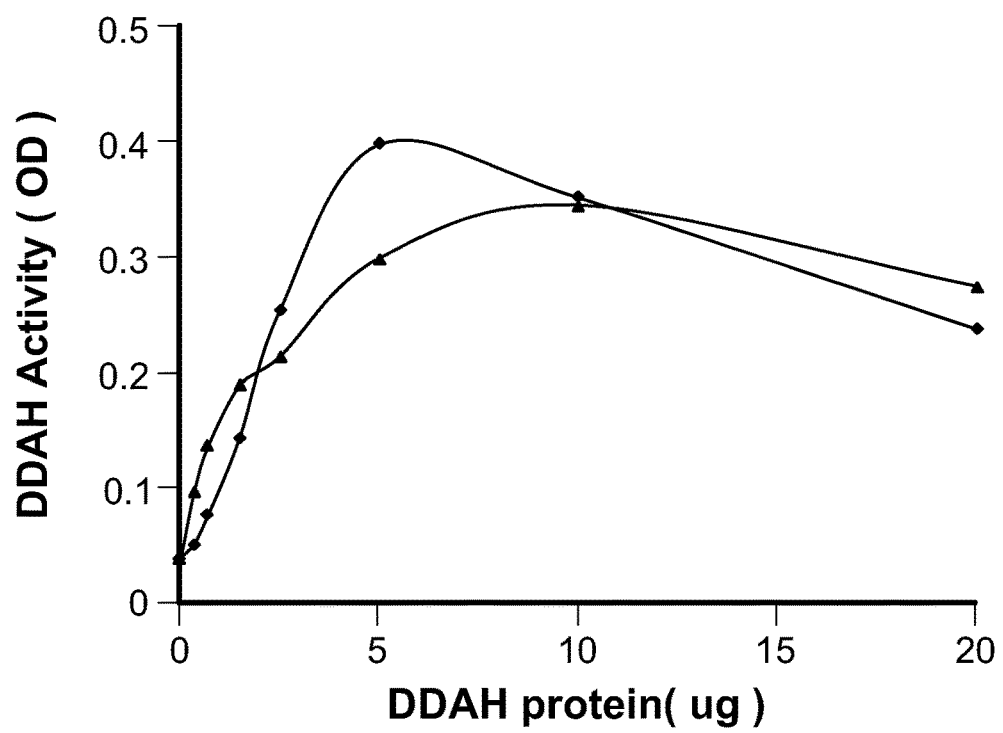
FIG. 2 Preservation of enzyme activity of matrix conjugated DDAH. Enzyme activity was determined by using different concentrations of unconjugated or matrix conjugated DDAH using the colorimetric assay as described in Example 1. The matrix conjugated DDAH retained greater then 90% of activity.
Figure 3:
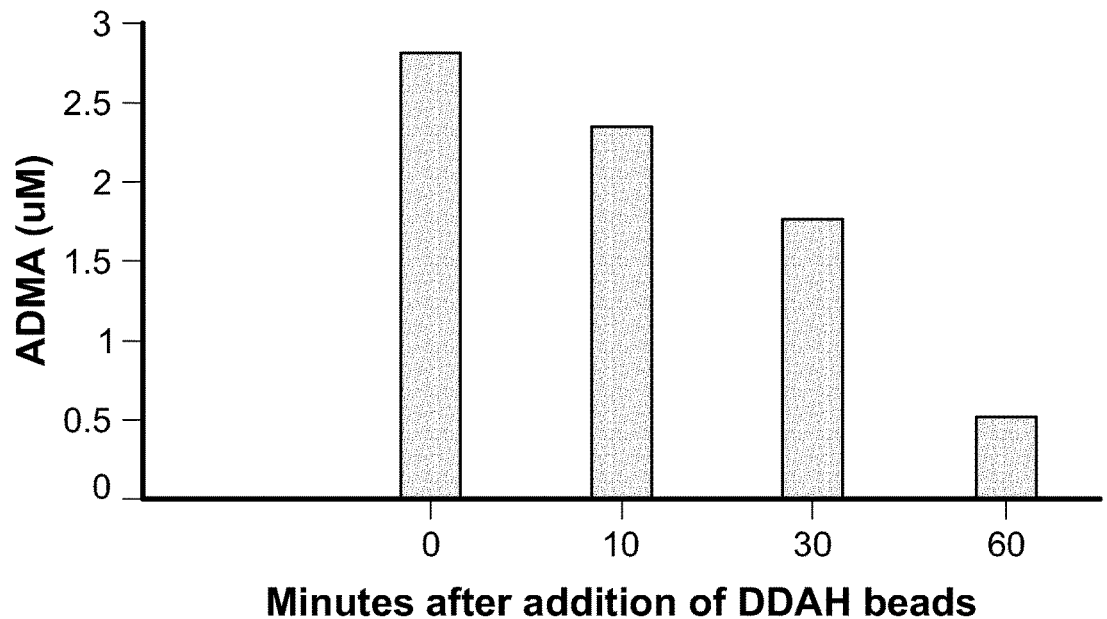
FIG. 3 Reduction of ADMA in plasma by matrix conjugated DDAH. Human or porcine plasma containing 2 uM of ADMA was incubated with DDAH conjugated beads for various length of time. Reduction in ADMA by matrix conjugated DDAH was determined using the HPLC assay.
Figure 4:
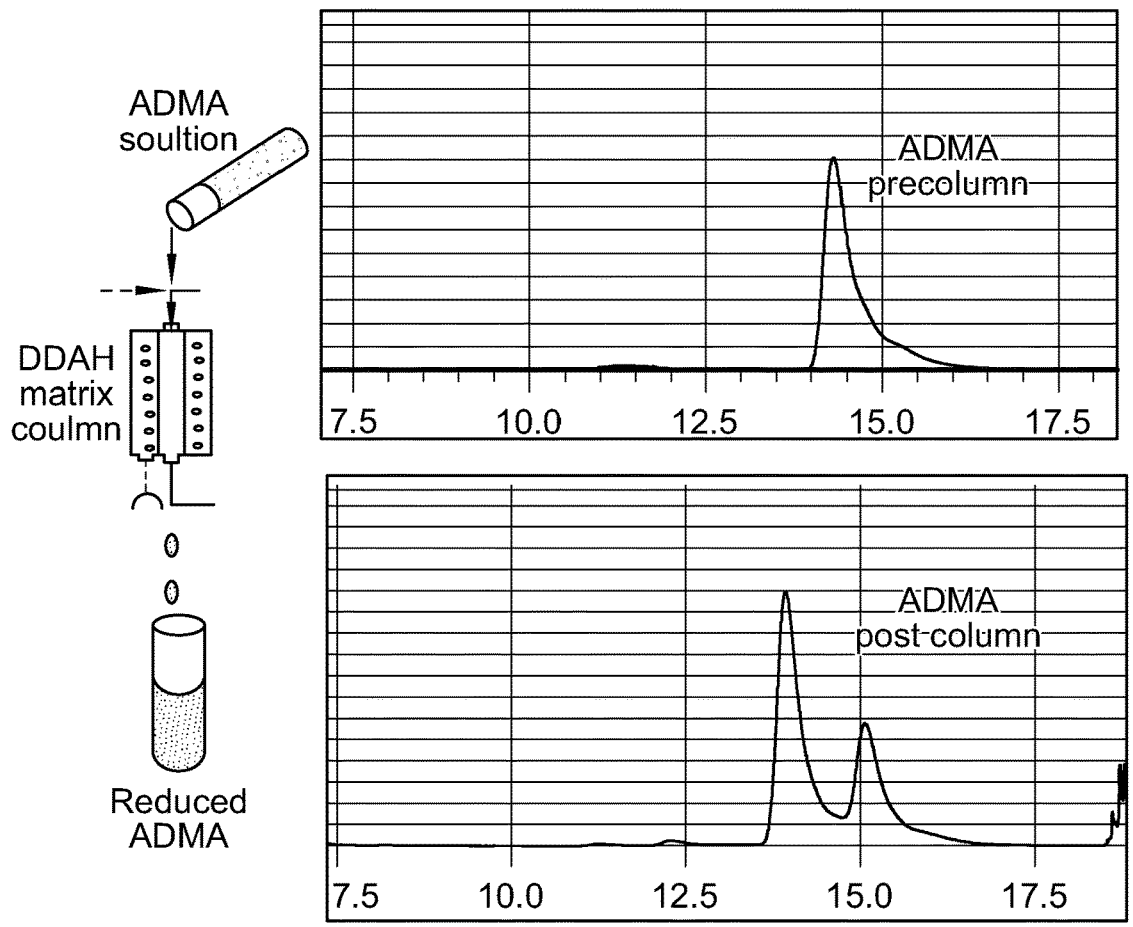
FIG. 4 ADMA reduction by using DDAH matrix column. A matrix conjugated DDAH column (1 ml volume) was prepared as a prototype therapeutic medical device. The column was equilibrated with saline solution. ADMA solution or plasma was then passed through the column at a flow rate of 1 ml/min. The concentration of ADMA in the starting solution (pre column) or after subjecting to DDAH matrix column (post column) was then determined using HPLC method. The reduction in HPLC peak is indicated in the chromatogram.
Figure 5A:
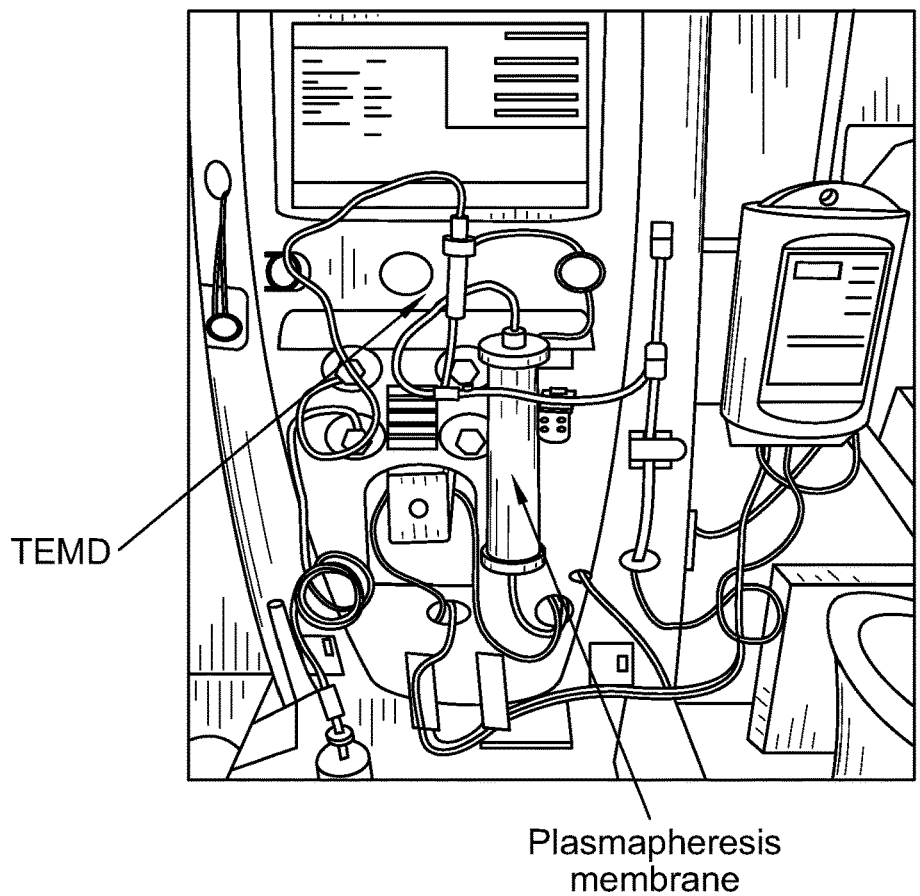
FIGS. 5A & 5B ADMA reduction in blood using plasmapheresis system and a prototype DDAH based Therapeutic Extracorporeal Medical Device. Pig blood was subjected to plasmapheresis using the Baxter Prismaflex therapeutic plasma exchange system similar to that used in patients in the clinical setting (FIG. 5A). A 14% fraction on plasma was circulated through a 9 ml DDAH-matrix device (Therapeutic Extracorporeal Medical Device) at a flow rate of 10 ml/min. Blood from the plasmapheresis membrane and the plasma from the TEMD was then combined and returned to the original blood. Reduction in ADMA in the blood over time was then determined using HPLC assay (results shown in FIG. 5B).
Figure 5B:
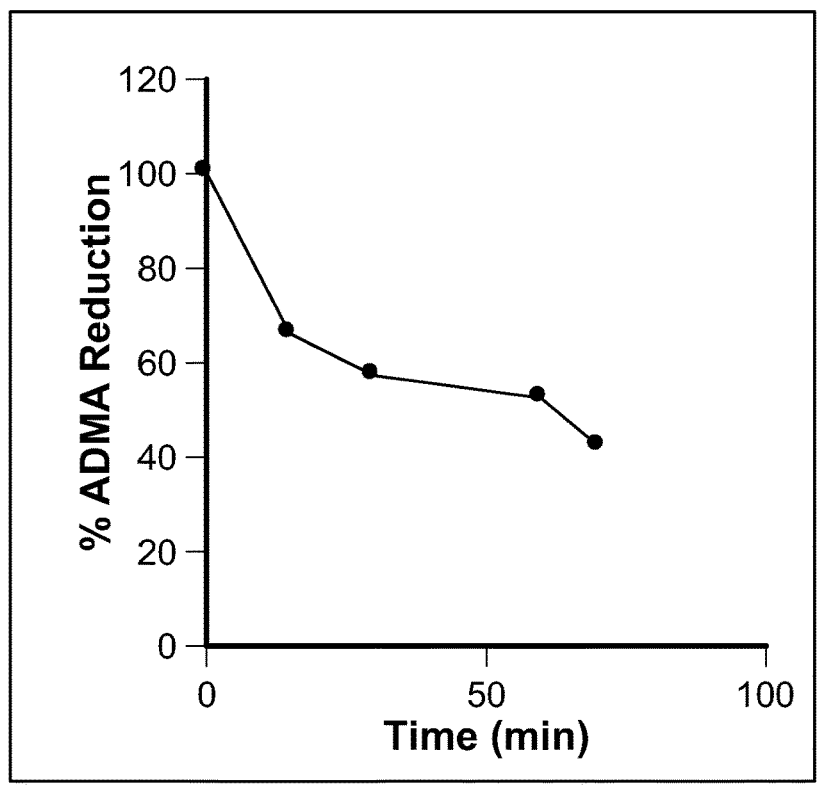

In describing and claiming the present disclosure, the following terminology will be used in accordance with the definitions set forth below.

As used herein, the term "pharmaceutically acceptable carrier" includes any of the standard pharmaceutical carriers, such as a phosphate buffered saline solution, water, emulsions such as an oil/water or water/oil emulsion, and various types of wetting agents. The term also encompasses any of the agents approved by a regulatory agency of the US Federal government or listed in the US Pharmacopeia for use in animals, including humans.

As used herein the term "pharmaceutically acceptable salt" refers to salts of compounds that retain the biological activity of the parent compound, and which are not biologically or otherwise undesirable. Many of the compounds disclosed herein are capable of forming acid and/or base salts by virtue of the presence of amino and/or carboxyl groups or groups similar thereto.

As used herein, the term "treating" includes prophylaxis of the specific disorder or condition, or alleviation of the symptoms associated with a specific disorder or condition and/or preventing or eliminating said symptoms.

As used herein an "effective" amount or a "therapeutically effective amount" refers to an alteration in the concentration of compound in a patient to provide a desired effect. For example one desired effect would be alleviating the symptoms associated with a disease state, wherein the disease state is aggravated by elevated levels of ADMA. In this embodiment the patient's blood or plasma would be contacted with a therapeutically effective amount of DDAH. The amount that is "effective" will vary from subject to subject, depending on the age and general condition of the individual, mode of administration, and the like. Thus, it is not always possible to specify an exact "effective amount." However, an appropriate "effective" amount in any individual case may be determined by one of ordinary skill in the art using routine experimentation.

As used herein, the term "purified" and like terms relate to the isolation of a molecule or compound in a form that is substantially free of contaminants normally associated with the molecule or compound in a native or natural environment.

As used herein, the term "purified" does not require absolute purity; rather, it is intended as a relative definition. The term "purified RNA" is used herein to describe an RNA sequence which has been separated from other compounds including, but not limited to polypeptides, lipids and carbohydrates.

The term "isolated" requires that the referenced material be removed from its original environment (e.g., the natural environment if it is naturally occurring). For example, a naturally-occurring nucleic acid present in a living animal is not isolated, but the same nucleic acid, separated from some or all of the coexisting materials in the natural system, is isolated.

As used herein the term "patient" without further designation is intended to encompass any warm blooded vertebrate domesticated animal (including for example, but not limited to livestock, horses, mice, cats, dogs and other pets) and humans.

As used herein the term "solid support" relates to a solvent insoluble substrate that is capable of forming linkages (preferably covalent bonds) with soluble molecules. The support can be either biological in nature, such as, without limitation, a cell or bacteriophage particle, or synthetic, such as, without limitation, an acrylamide derivative, glass, plastic, agarose, cellulose, nylon, silica, or magnetized particles. The support can be in particulate form or a monolithic strip or sheet. The surface of such supports may be solid or porous and of any convenient shape.

As used herein the term "plasmapheresis system" defines all the necessary components required to conduct plasmapheresis, including removal of blood out of a patient's body, separation of plasma from the blood cells, and subsequent return of plasma and other blood components to the body.

The word "substantially" does not exclude "completely" e.g. a composition which is "substantially free" from Y may be completely free from Y. Where necessary, the word "substantially" may be omitted from the definition of the present disclosure.

Unless specified otherwise the terms "comprising" and "comprise", and grammatical variants thereof are intended to represent "open" or "inclusive" language such that they include recited elements but also permit inclusion of additional, unrecited elements.

As used herein the term "about", in the context of concentrations of components of the formulations, typically means +/−5% of the stated value more typically +/−4% of the stated value, more typically +/−3% of the stated value, more typically +/−2% of the stated value, even more typically −/−1% of the stated value, and even more typically +/−05% of the stated value.

The term "epoxide", "epoxy group" or "oxirane" depicts a chemical functional group consisting of a three-membered ring arrangement of two carbon atoms and one oxygen atom. The two carbon atoms in the three-membered ring may be independently substituted. The term "epoxide" may also depict a molecule or compound that comprises at least one epoxy group.

The term "epoxide-containing compound" means any compound that is an epoxide or a compound which contains an epoxide moiety. Exemplary epoxide containing compounds are alkylene oxides and in particular lower alkylene oxides such as ethylene oxide, propylene oxide, butylene oxide, alcohol epoxides such as glycidol, and epihalohydrins such as epichlorohydrin, epibromohydrin, epiiodohydrin, 1,2-epoxy-4-chlorobutane, 1,2-epoxy-4-bromobutane, 1,2-epoxy-4-iodobutane, 2,3-epoxy-4-chlorobutane, 2,3-epoxy-4-bromobutane, 2,3-epoxy-4-iodobutane, 2,3-epoxy-5-chloropentane, 2,3-epoxy-5-bromopentane, 1,2-epoxy-5-chloropentane, etc., epoxy compounds such as 2,2-bis(p-1,2-epoxypropoxyphenyl)-propane1,4-bis(1,2-epoxypropoxy) benzene-N,N'-bis(2,3-epoxypropyl)piperazine etc.

The terms "electrophilic group", "electrophile" and the like as used herein refers to an atom or group of atoms that can accept an electron pair to form a covalent bond. The "electrophilic group" used herein includes but is not limited to halide, carbonyl and epoxide containing compounds. Common electrophiles may be halides such as thiophosgene, glycerin dichlorohydrin, phthaloyl chloride, succinyl chloride, chloroacetyl chloride, chlorosucciriyl chloride, etc.; ketones such as chloroacetone, bromoacetone, etc.; aldehydes such as glyoxal, etc.; isocyanates such as hexamethylene diisocyanate, tolylene diisocyanate, meta-xylylene diisocyanate, cyclohexylmethane-4,4-diisocyanate, etc and derivatives of these compounds.

The terms "nucleophilic group", "nucleophile" and the like as used herein refers to an atom or group of atoms that have an electron pair capable of forming a covalent bond. Groups of this type may be ionizable groups that react as anionic groups. The "nucleophilic group" used herein includes but is not limited to hydroxyl, primary amines, secondary amines, tertiary amines and thiols.

As an aid, the following table provides various starting electrophiles and nucleophiles which may be combined to create a desired functional group. The information provided is meant to be illustrative and not limiting to the synthetic techniques described herein.

TABLE 1

Examples of Covalent Linkages and Precursors Thereof

| Covalent Linkage Product | Electrophile | Nucleophile |
| --- | --- | --- |
| Carboxamides | Activated esters | amines/anilines |
| Carboxamides | acyl azides | amines/anilines |
| Carboxamides | acyl halides | amines/anilines |
| Esters | acyl halides | alcohols/phenols |
| Esters | acyl nitriles | alcohols/phenols |
| Carboxamides | acyl nitriles | amines/anilines |
| Imines | Aldehydes | amines/anilines |
| Hydrazones | aldehydes or ketones | Hydrazines |
| Oximes | aldehydes or ketones | Hydroxylamines |
| Alkyl amines | alkyl halides | amines/anilines |
| Esters | alkyl halides | carboxylic acids |
| Thioethers | alkyl halides | Thiols |
| Ethers | alkyl halides | alcohols/phenols |
| Thioethers | alkyl sulfonates | Thiols |
| Esters | alkyl sulfonates | carboxylic acids |
| Ethers | alkyl sulfonates | alcohols/phenols |
| Esters | Anhydrides | alcohols/phenols |
| Carboxamides | Anhydrides | amines/anilines |
| Thiophenols | aryl halides | Thiols |
| Aryl amines | aryl halides | Amines |
| Thioethers | Azindines | Thiols |
| Boronate esters | Boronates | Glycols |
| Carboxamides | carboxylic acids | amines/anilines |
| Esters | carboxylic acids | Alcohols |
| Hydrazines | Hydrazides | carboxylic acids |
| N-acylureas or Anhydrides | Carbodiimides | carboxylic acids |
| Esters | Diazoalkanes | carboxylic acids |
| Thioethers | Epoxides | Thiols |
| Thioethers | Haloacetamides | Thiols |
| Ammotriazines | Halotriazines | amines/anilines |
| Triazinyl ethers | Halotriazines | alcohols/phenols |
| Amidines | imido esters | amines/anilines |
| Ureas | Isocyanates | amines/anilines |

TABLE 1-continued

Examples of Covalent Linkages and Precursors Thereof

| Covalent Linkage Product | Electrophile | Nucleophile |
|---|---|---|
| Urethanes | Isocyanates | alcohols/phenols |
| Thioureas | Isothiocyanates | amines/anilines |
| Thioethers | Maleimides | Thiols |
| Phosphite esters | phosphoramidites | Alcohols |
| Silyl ethers | silyl halides | Alcohols |
| Alkyl amines | sulfonate esters | amines/anilines |
| Thioethers | sulfonate esters | Thiols |
| Esters | sulfonate esters | carboxylic acids |
| Ethers | sulfonate esters | Alcohols |
| Sulfonamides | sulfonyl halides | amines/anilines |
| Sulfonate esters | sulfonyl halides | phenols/alcohols |

In general, carbon electrophiles are susceptible to attack by complementary nucleophiles, including carbon nucleophiles, wherein an attacking nucleophile brings an electron pair to the carbon electrophile in order to form a new bond between the nucleophile and the carbon electrophile.

Non-limiting examples of carbon nucleophiles include, but are not limited to alkyl, alkenyl, aryl and alkynyl Grignard, organolithium, organozinc, alkyl-, alkenyl, aryl- and alkynyl-tin reagents (organostannanes), alkyl-, alkenyl-, aryl- and alkynyl-borane reagents (organoboranes and organoboronates); these carbon nucleophiles have the advantage of being kinetically stable in water or polar organic solvents. Other non-limiting examples of carbon nucleophiles include phosphorus ylids, enol and enolate reagents; these carbon nucleophiles have the advantage of being relatively easy to generate from precursors well known to those skilled in the art of synthetic organic chemistry. Carbon nucleophiles, when used in conjunction with carbon electrophiles, engender new carbon-carbon bonds between the carbon nucleophile and carbon electrophile.

Non-limiting examples of non-carbon nucleophiles suitable for coupling to carbon electrophiles include but are not limited to primary and secondary amines, thiols, thiolates, and thioethers, alcohols, alkoxides, azides, semicarbazides, and the like. These non-carbon nucleophiles, when used in conjunction with carbon electrophiles, typically generate heteroatom linkages (C—X—C), wherein X is a heteroatom, including, but not limited to, oxygen, sulfur, or nitrogen.

The term "ether" or "ether containing" refers to a class of organic compounds of general formula R—O—R, wherein R is carbon. The term "ether" or "ether containing" as used herein is intended to exclude those compounds where R is not carbon for example sialyl ethers, Si—O—Si.

The term "polyamine" refers to an organic compound having at least two positively amino groups selected from the group comprising primary amino groups secondary amino groups and tertiary amino groups. Accordingly, a polyamine covers diamines, triamines and higher amines.

The term "biodegradable" or "biodegradable polymer" as used herein refers to materials that are degradable and/or compostable. Such materials may be degradable by various living organisms or by exposure to light and/or oxygen. Therefore, the term "biodegradable", as used herein will be understood to include materials that are oxobiodegradable, photobiodegradable and microbially biodegradable.

The term "biocompatible" or "biocompatible polymer" refers to polymers which, in the amounts employed, are non-toxic, non-migratory, chemically inert, and substantially non-immunogenic when used in contact with biological fluids, for example plasma or blood. Suitable biocompatible polymers include, by way of example, polysaccharides such as cellulose or chitin.

The term "biopolymer" refers to polymers that are produced by or derived from living organisms. Exemplary biopolymers include polypeptides, nucleic acids and polysaccharides, for example cellulose and chitin.

As used herein, the term "water soluble polymer" refers to any polymer that is soluble in aqueous solvents. Such water soluble polymers include, but are not limited to, polyethylene glycol, polyethylene glycol propionaldehyde, mono $C_1$-$C_{10}$ alkoxy or aryloxy derivatives thereof (described in U.S. Pat. No. 5,252,714 which is incorporated by reference herein), monomethoxy-polyethylene glycol, polyvinyl pyrrolidone, polyvinyl alcohol, polyamino acids, divinylether maleic anhydride, N-(2-Hydroxypropyl)-methacrylamide, dextran, dextran derivatives including dextran sulfate, polypropylene glycol, polypropylene oxide/ethylene oxide copolymer, polyoxyethylated polyol, heparin, heparin fragments, polysaccharides, oligosaccharides, glycans, cellulose and cellulose derivatives, including but not limited to methylcellulose and carboxymethyl cellulose, serum albumin, starch and starch derivatives, polypeptides, polyalkylene glycol and derivatives thereof, copolymers of polyalkylene glycols and derivatives thereof, polyvinyl ethyl ethers, and alpha-beta-poly[(2-hydroxyethyl)-DL-aspartamide, and the like, or mixtures thereof.

The term "functional" or "functional group", when used to describe a molecule or substance, refers to a group of atoms arranged in a way that determines the chemical properties of the substance and the molecule to which it is attached. Examples of functional groups include halogen atoms, amide groups, hydroxyl groups, carboxylic acid groups and the like.

The term "functional substances" and the like, used herein refers broadly to mean molecules or active substances having a site capable of reacting with or bonding with or having an affinity with a target molecule. The term "functional substances" and the like broadly encompass the biological substances and biomolecules.

The terms "biological substances" or "biomolecules" and the like, used herein, refer to any substances and compounds substantially of biological origin. Hence, the terms encompass hot only native molecules, such as those that can be isolated from natural sources, but also forms, fragments and derivatives derived therefrom as well as recombinant forms and artificial molecules, as long as at least the property of the native molecules is present. Therefore, the term covers organic molecules that are produced by a living organism, including large polymeric molecules such as proteins, polysaccharides and nucleic acids as well as small molecules such as primary metabolites, secondary metabolites and natural products.

The terms "biologically active substances", "bioactive substances" and the like, used herein, refer broadly to mean biological molecules or physiologically active substances having a site capable of reacting with or bonding with or having an affinity with a target molecule. This includes but is not limited to substances having a catalytically active site such as enzymes, substances having a site capable of bonding to specific compounds or specific classes of compounds, such as nucleic acids oligonucleotides, deoxyribonucleic acid (DNA), ribonucleic acid (RNA), or lectins, vitamins, peptides, proteins, hormones, endocrine disturbing chemicals, sugars, lipids and the like.

The term "suitable matrix" means a matrix that is composed of a material that does not appreciably react chemically or biologically with unmodified biological substances as defined above. In some embodiments, the biological substance may comprise a biomolecule and the suitable matrix is composed of a material that is biocompatible in that the matrix material is not toxic and does not cause any adverse health effect to the human body. Suitable matrix that are also biocompatible are typically polymeric materials that are generally insoluble, flexible and which can conform to many different shapes, including curved surfaces. It is noted that the term "polymer" is used to denote a chemical compound with high molecular weight consisting of a number of structural units linked together by covalent bonds. Exemplary polymeric materials that are suitable and biocompatible with biological substances as defined above include but are not limited to polysaccharides, cellulose, amberlite, glutaraldehyde-activated chitosan, alginate, PLGA-PEG, and p(HEMA-EGDMA).

As used herein, the term "alkyl" includes within its meaning monovalent ("alkyl") and divalent ("alkylene") straight chain or branched chain or cyclic saturated aliphatic groups having from 1 to 25 carbon atoms, eg, 1, 2, 3, 4, 5, 6, 7, 8, 9, 10, 11, 12, 13, 14, 15, 16, 17, 18, 19, 20, 21, 22, 23, 24 or 25 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-triraethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, and the like. Lower alkyls are alkyl groups as defined above 1 to 6 carbon atoms, preferably 1 to 4 carbon atoms.

The term "alkenyl" as used herein includes within its meaning monovalent ("alkenyl") and divalent ("alkenylene") straight or branched chain or cyclic unsaturated aliphatic hydrocarbon group shaving from 2 to 25 carbon atoms, eg, 2, 3, 4, 5, 6, 7, 8, 9, 10, 11, 12, 13, 14, 15, 16, 17, 18, 19, 20, 21, 22, 23, 24 or 25 carbon atoms and having at least one double bond, of either E, Z, cis or trans stereochemistry where applicable, anywhere in the alkyl chain. Examples of alkenyl groups include but are not limited to vinyl, allyl, 1-methylvinyl, 1-propenyl, 2-methyl-1-propenyl, 2-methyl-1-propenyl, 1-butenyl, 2-butenyl, 3-butentyl, 1,3-butadienyl, 1-pehtenyl, 2-pententyl, 3-pentenyl, 4-pentenyl, 1,3-pentadienyl, 2,4-pentadienyl, 1,4-pentadienyl, 3-methyl-2-butenyl, 1-hexenyl, 2-hexenyl, 3-hexenyl, 1,3-hexadienyl, 1,4-hexadienyl, 2-methylpentenyl, 1-heptenyl, 2-heptentyl, 3-heptenyl, 1-octenyl, 1-nonenyl, 1-decenyl, and the like. Lower alkenyls are alkenyl groups as defined above with 2 to 6 carbon atoms preferably 2 to 4 carbon atoms. The term "alkynyl" as used herein includes within its meaning monovalent ("alkynyl") and divalent ("alkynylene") straight or branched chain or cyclic unsaturated aliphatic hydrocarbon groups having from 2 to 10 carbon atoms and having at least one triple bond anywhere in the carbon chain. Examples of alkynyl groups include but are not limited to ethynyl, 1-propynyl, 1-butynyl, 2-butynyl, 1-methyl-2-butynyl, 3-methyl-1-butynyl, 1-pentynyl, 1-hexynyl, methylpentynyl, 1-heptynyl, 2-heptynyl, 1-octynyl, 2-octynyl, 1-nonyl, 1-decynyl, and the like. Lower alkynylene are alkynylene groups as defined above with 2 to 6 carbon atoms, preferably 2 to 4 carbon atoms.

The term "aryl" as used herein refers to a mono- or multiple-cyclic carbocyclic ring system having one or more aromatic rings including, but not limited to, phenyl, naphthyl, tetrahydronaphthyl, indanyl, indenyl and the like. Aryl groups (including bicyclic aryl groups) can be unsubstituted or substituted with one to five substituents or more (typically one to five substituent for monocyclic aryl and more than five substituents for bicyclic/oligocylic aryl) independently selected from the group consisting of alkyl, alkenyl, alkynyl, haloalkyl, alkoxy, thioalkoxy, hydroxy, mercapto, amino, alkylamino, dialkylamino, acylamino, aminoacyl, alkoxycarbonyl, aryloxycarbonyl, azido, cyano, halo, nitro, carboxaldehyde, carboxy, carboxamide, carbamide, carbamate, sulfate, sulfonate, sulfinate, phosphate, phosphonate, phosphinate, phosphine, and protected hydroxy. In addition, substituted aryl groups include tetraflubrophenyl and pentafluorophenyl.

The term "heteroaryl", whether used alone or as part of another group, refers to a substituted or unsubstituted aromatic heterocyclic ring system (monocyclic or bicyclic). Heteroaryl groups can have, for example, from about 3 to about 50 carbon atoms. Heteroaryl groups typically include aromatic heterocyclic rings systems having about 4 to about 14 ring atoms and containing carbon atoms and 1, 2, 3, or 4 heteroatoms selected from oxygen, nitrogen or sulfur. Exemplary heteroaryl groups include but are not limited to furan, thiophene, indole, azaindole, oxazole, thiazole, isoxazole, isothiazole, imidazole, N-methylimidazole, pyridine, pyrimidine, pyrazine, pyrrole, N-methylpyrrole, pyrazole, N-methylpyrazole, 1,3,4-oxadiazole, 1,2,4-triazole, 1-methyl-1,2,4-triazole, 1H-tetrazole, 1-methyltetrazole, benzoxazole, benzothiazole, benzofuran, benzisoxazole, benzimidazole, N-methylbenzimidazole, azabenzimidazole, indazole, quinazoline, quinoline, and isoquinoline. Bicyclic aromatic heteroaryl groups include phenyl, pyridine, pyrimidine or pyridizine rings that are (a) fused to a 6-membered aromatic (unsaturated) heterocyclic ring having one nitrogen atom; (b) fused to a 5- or 6-membered aromatic (unsaturated) heterocyclic ring having two nitrogen atoms; (c) fused to a 5-membered aromatic (unsaturated) heterocyclic ring having one nitrogen atom together with either one oxygen or one sulfur atom; or (d) fused to a 5-membered aromatic (unsaturated) heterocyclic ring having one heteroatom selected from O, N or S. The term "heteroaryl" also includes aromatic heterocyclic rings that are substituted, for example with 1 to 5 substituents independently selected from the group consisting of alkyl, alkenyl, alkynyl, haloalkyl, alkoxy, thioalkoxy, hydroxy, mercapto, amino, alkylamino, dialkylamino, acylamino, aminoacyl, alkoxycarbonyl, aryloxycarbonyl, azido, cyano, halo, nitro, carboxaldehyde, carboxy, carboxamide, carbamide, carbamate, sulfate, sulfonate, sulfinate, phosphate, phosphonate, phosphinate, phosphine, and protected hydroxy.

The term "optionally substituted" as used herein means the group to which this term refers may be unsubstituted or may be substituted with one or more groups independently selected from alkyl, alkenyl, alkynyl, aryl, heteroaryl, thioalkyl, cycloalkyl, cycloalkenyl, heterocycloalkyl, halo, carboxyl, carboxyalkyl, haloalkyl, haloalkynyl, hydroxy, alkoxy, thioalkoxy, mercapto, alkenyloxy, haloalkoxy, haloalkenyloxy, nitro, amino, nitroalkyl, nitroalkenyl, nitroalkynyl, nitroheterocyclyl, alkylamino, dialkylamino, alkenylamine, alkynylamino, acyl, alkenoyl, alkynoyl, acylamino, diacylamino, aminoacyl, acyloxy, alkylsulfonyloxy, heterocycloxy, heterocycloamino, haloheterocycloalkyl, alkoxycarbonyl, aryloxycarbonyl, azido, carboxaldehyde, carboxy, carboxamide, carbamide, carbamate, oxime, hydroxylamine, sulfate, sulfonate, sulfinate, alkylsulfenyl, alkylcarbonyloxy, alkylthio, acylthio, phosphorus-containing groups such as phosphate, phosphonate, phosphinate and phosphine, aryl, heteroaryl, alkylaryl, alkylheteroaryl, cyano, cyanate, isocyanate, C(O)NH(alkyl), —C(O)N(alkyl).sub.2 and —C(O)NR'R" where R and R' are independently hydrogen, alkyl aryl or heteroaryl as defined herein.

The term "halogen" or variants such as "halide" or "halo" as used herein refers to fluorine, chlorine, bromine and iodine.

The term "amino" or "amine" as used herein refers to groups of the form $R_a$—N—$R_b$ wherein $R_a$ and $R_b$ are individually selected from the group including but not limited to hydrogen, optionally substituted alkyl, optionally substituted alkenyl, optionally substituted alkynyl, and optionally substituted aryl groups.

The terms "chemically coupled" and "chemically couple" and grammatical variations thereof refer to the covalent and noncovalent bonding of molecules and include specifically, but not exclusively, covalent bonding, electrostatic bonding, hydrogen bonding and van der Waals' bonding. The terms encompass both indirect and direct bonding of molecules. Thus, if a first compound is chemically coupled to a second compound, that connection may be through a direct chemical bond, or through an indirect chemical bond via other compounds, linkers or connectors.

The term "recombinant host cell," also referred to as "host cell," refers to a cell which includes an exogenous polynucleotide, wherein the methods used to insert the exogenous polynucleotide into a cell include, but are not limited to, direct uptake, transduction, f-mating, or other methods known in the art to create recombinant host cells. By way of example only, such exogenous polynucleotide may be a nonintegrated vector, including but not limited to a plasmid, or may be integrated into the host genome.

As used herein, "DDAH1" or "DDAH2" shall include those polypeptides and proteins of human or non-human origin that have at least one biological activity of a human DDAH enzyme, including but not limited to DDAH analogs, DDAH isoforms, DDAH mimetics, DDAH fragments, hybrid DDAH proteins, fusion proteins oligomers and multimers, homologues, glycosylation pattern variants, and muteins, thereof, regardless of the biological activity of same, and further regardless of the method of synthesis or manufacture thereof including, but not limited to, recombinant (whether produced from cDNA, genomic DNA, synthetic DNA or other form of nucleic acid), synthetic, transgenic, and gene activated methods. As used herein, the term "DDAH unit", or DDAH "enzymatic unit", [U], refers to that amount of enzyme (DDAH) which causes the production of 1 mmole of citrulline in one minute under the conditions defined in Markus Knipp and Milan Vasak. Analytical Biochem. 286, 257 (2000). The amino acid sequence and polynucleotide sequence for DDAH1 and DDAH2 from a variety of origins are as follows:

TABLE 2

Human DDAH Sequences

| SEQ ID NO: | Sequence Name | Sequence |
|---|---|---|
| 1 | Human DDAH1 amino acid sequence | MAGLGHPAAF GRATHAVVRA LPESLGQHAL RSAKGEEVDV ARAERQHQLY VGVLGSKLGL QVVELPADES LPDCVFVEDV AVVCEETALI TRPGAPSRRK EVDMMKEALE KLQLNIVEMK DENATLDGGD VLFTGREFFV GLSKRTNQRG AEILADTFKD YAVSTVPVAD GLHLKSFCSM AGPNLIAIGS SESAQKALKI MQQMSDHRYD KLTVPDDIAA NCIYLNIPNK GHVLLHRTPE EYPESAKVYE KLKDHMLIPV SMSELEKVDG LLTCCSVLIN KKVDS |
| 2 | Human DDAH 2 amino acid sequence | MGTPGEGLGR CSHALIRGVP ESLASGEGAG AGLPALDLAK AQREHGVLGG KLRQRLGLQL LELPPEESLP LGPLLGDTAV IQGDTALITR PWSPARRPEV DGVRKALQDL GLRIVEIGDE NATLDGTDVL FTGREFFVGL SKWTNHRGAE IVADTFRDFA VSTVPVSGPS HLRGLCGMGG PRTVVAGSSD AAQKAVRAMA VLTDHPYASL TLPDDAAADC LFLRPGLPGV PPFLLHRGGG DLPNSQEALQ KLSDVTLVPV SCSELEKAGA GLSSLCLVLS TRPHS |
| 3 | Human DDAH1 mRNA nucleotide sequence | aacttaatgt ttttgcattg gactttgagt taagattatt ttttaaatcc tgaggactag cattaattga cagctgaccc aggtgctaca cagaagtgga ttcagtgaat ctaggaagacagcagcagac aggattccag gaaccagtgt ttgatgaagc taggactgag gagcaagcgagcaagcagca gttcgtggaa tcctgtctgc tgctgtcttc ctggtttagg agccgacgggcgctcgcagg ctcagcgcgc gctgcccgcg gcaggacccg gccgcctccg ccgccgccgc cgcccctaag cctcccgaag ccatggccgg gctcggccac cccgccgcct tcggccgggccacccacgcc gtggtgcggg cgctacccga gtcgctcggc cagcacgcgc tgagaagcgccaagggcgag gaggtggacg tcgcccgcgc ggaacggcag caccagctct acgtgggcgtgctgggcagc aagctggggc tgcaggtggt ggagctgccg gccgacgaga gccttccggactgcgtcttc gtgaggacg tggccgtggt gtgcgaggag acggccctca tcacccgacc cggggcgccg agccggagga aggaggttga catgatgaaa gaagcattag aaaaacttcagctcaatata gtagagatga |

TABLE 2-continued

Human DDAH Sequences

| SEQ ID NO: | Sequence Name | Sequence |
|---|---|---|
| | | aagatgaaaa tgcaacttta gatggcggag atgttttattcacaggcaga gaattttttg tgggcctttc caaaaggaca aatcaacgag gtgctgaaatcttggctgat acttttaagg actatgcagt ctccacagtg ccagtggcag atgggttgcatttgaagagt ttctgcagca tggctgggcc taacctgatc gcaattgggt ctagtgaatc tgcacagaag gcccttaaga tcatgcaaca gatgagtgac caccgctacg acaaactcactgtgcctgat gacatagcag caaactgtat atatctaaat atccccaaca aagggcacgtcttgctgcac cgaacccccgg aagagtatcc agaaagtgca aaggtttatg agaaactgaaggaccatatg ctgatccccg tgagcatgtc tgaactggaa aaggtggatg ggctgctcacctgctgctca gttttaatta acaagaaagt agactcctga gctgcagagt cccccccggt agccggcaag accgcacagg caaggccgat gactctgtgc ccactcctgt tgttttccttgacaatctac tgtgccactg tgctactaac tcttgtttac aaaatttgat tctaagttgaattgcttcat tcaacacccc cacccctcct ccccrcgagg tggtacctaa gctgtggatttgctaaatga attaagcaac ctagaagata cagagctaat gaattatcaa aatgtgattaatcccagtaa ggaaacactc atttagtgtc tgtattttttg gtgtnaaaat tatttagttg ccagtatatt ctgaagaatg tcttcttgat cagtcagata agcttgcttt ttttttttttttttttcatgaa tcatgttttgg ttcctgtgaa agtccctggt ccagggatcc tcctcctttctcttttactt ctg |
| 4 | Human DDAH2 mRNA nucleotide sequence | ccgcttagac aatgccccgg agccgccaga ccgtcgcgcc cctgccccat cgtagtatatgagctcgcct acacaaggac ccccgctaaa agccagagct cccagtcccc gaggcttgaagacggggact cccttctcca ccaactctgt cctcgggggg tggggcccca gccgagatcacagcgcgaca ggagtgggggg tggccgctgg agacaggtga agaaacaaga aaactaagaaatccgagcgg ttggagggggg agtctgtgtg gatgggatgg ggacgccggg ggaggggctg ggccgctgct cccatgccct gatccgggga gtcccagaga gcctggcgtc gggggaaggtgcgggggctg gccttcccgc tctggatctg gccaaagctc aaagggagca cggggtgctgggaggtaaac tgaggcaacg actggggcta cagctgctag aactgccacc tgaggagtcattgccgctgg gaccgctgct tgcgacacg ccgtgatcc aaggggacac ggccctaatcacgcggccct ggagccccgc tcgtaggcca gaggtcgatg gagtccgcaa agccctgcaa gacctgggggc tccgaattgt ggaaatagga gacgagaacg cgacgctgga tggcactgacgttctcttca ccggccggga gttttttcgta ggcctctcca aatggaccaa tcaccgaggagctgagatcg tggcggacac gttccgggac ttcgccgtct ccactgtgcc agtctcgggtcctcccacc tgcgcggtct ctgcggcatg ggggacctc gcactgttgt ggcaggcagcagcgacgctg cccaaaaggc tgtccgggca atggcagtgc tgacagatca cccatatgcc tccctgaccc tcccagatga cgcagctgct gactgcctct ttcttcgtcc tgggttgcctggtgtgcccc ctttcctcct gcaccgtgga ggtgggggatc tgcccaacag ccaggaggcactgcagaagc tctctgatgt caccctggta cctgtgtcct gctcagaact ggagaaggctggcgccgggc tcagctccct ctgcttggtg ctcagcacac gcccccacag ctgagggcctggccttgggg tactgctggc caggggtagg atagtatagg aagtagaagg ggaaggagggg ttagatagag aatgctgaat aggcagtagt tgggagagag cctcaatatt gggggagggggagagtgtagg gaaaaggatc cactgggtga atcctccctc tcagaaccaa taaaatagaattgacctttt aaaaaaaaaa a |
| 5 | Human DDAH1 isoform 2 amino acid sequence (missing residues 1-103 of DDAH1) | MMKEALEKLQ LNIVEMKDEN ATLDGGDVLF TGREFFVGLS KRTNQRGAEI LADTFKDYAV STVPVADGLH LKSFCSMAGP NLIAIGSSES AQKALKIMQQ MSDHRYDKLT VPDDIAANCI YLNIPNKGHV LLHRTPEEYP ESAKVYEKLK DHMLIPVSMS ELEKVDGLLT CCSVLINKKV DS |

TABLE 3

Bovine DDAH Sequences

| SEQ ID NO: | Sequence Name | Sequence |
|---|---|---|
| 6 | Bovine DDAH1 amino acid sequence | MASLGHPATF GRATHVVVRA LPESLAQQAL RRTKGDEVDF ARAERQHQLY VGVLGSKLGLQVVQLPADES LPDCVFVEDV AVVCEETALI TRPGAPSRRK EADMMKEALE KLQLNIVEMK DENATLDGGD VLFTGREFFV GLSKRTNQRG AEILADTFKD YAVSTVPVVD ALHLKSFCSM AGPNLIAIGS SESAQKALKI MQQMSDHRYD KLTVPDDTAA NCIYLNIPSK GHVLLHRTPE EYPESAKVYE KLKDHMLIPV SNSELEKVDG LLTCSSVLIN KKVDS |
| 7 | Bovine DDAH 2 amino acid sequence | MGTPGEGLGR CSHALIRGVP ESLASGEGAA AGLPALDLAK AQREHGVLGG KLRQRLGLQL VELPPEESLP LGPLLGDTAV IQGDTALITR PWSPARRPEV DGVRKALQDL GLRIVEMGDE NATLDGTDVL FTGREFFVGL SKWTNHRGAE IVADTFRDFA VSTVPVTSTS HLRGLCGMGG PRTVVAGSSE AAQKAVRAMA VLTDHPYASL TLPDDAAADC LFLRPGQPGL PPFLLHRGGG DLPNSQEALQ KLSDVTLVPV SCSELEKAGA GLSSLCLVLS TRPHN |
| 8 | Bovine DDAH1 nucleotide sequence | atggcttctc tcggccaccc agccaccttt ggccgggcca cccatgtcgt ggtacgggcgctgcccgagt ccctcgccca acaggcgctg aggcgcacca agggcgacga ggtggatttcgcccgcgctg agcggcagca ccagctctac gtgggcgtgc tgggcagtaa actggggctgcaggtggtgc agctgcccgc cgacgagagc ctcccagact gcgtgttcgt ggaggacgtggccgtggtgt gcgaggagac ggccctgatc acccgccccg ggcgccgag ccggaggaag gaggctgacatgatgaaaga agcactagaa aacttcagc tcaacatagt agagatgaaagatgaaaatg caactttaga tggtggagat gtcttattca caggcagaga atttttttgtgggccttttcca aaaggacaaa tcaacgaggt gcgaaatct tggctgatac ttttaaggactatgcggtct ccacggtccc tgtggtggat gctttgcact tgaaagagttt ctgcagcatggctgggccta acctaatcgc tattggatcc agtgaatctg cacagaaggc cctcaagatcatgcaacaga tgagtgatca tcgctacgac aaactcacag tgcctgatga cacggccgcaaactgcatat acctgaatat ccccagcaaa ggccacgtct tgctgcaccg aaccccagaagagtacccag agagtgcaaa ggtttatgaa aagctgaagg accatatgct gatccccgtgagcaattctg aactggaaaa ggtgacgggg ctgctcacct gcagctcggt tttaattaacaagaaagtag actcctga |

TABLE 4

Murine DDAH Sequences

| SEQ ID NO: | Sequence Name | Sequence |
|---|---|---|
| 9 | Murine DDAH1 amino acid sequence | MAGLGHPSAF GRATHAVVRA PPESLCRHAL RRSQGEEVDF ARAERQHELY VGVLGSKLGL QVVQLPADES LPDCVFVEDV AVVCEETALI TRPGAPSRRK EVDMMKEALE KLQLNIVEMK DENATLDGGD VLFTGREFFV GLSKRTNQRG AEILADTFKD YAVSTVPVAD SLHLKSFCSM AGPNLIAIGS SESAQKALKI MQQMSDHRYD KLTVPDDMAA NCIYLNIPSK GHVLLHRTPE EYPESAKVYE KLKDHLLIPV SNSEMEKVDG LLTCCSVFIN KKIDS |
| 10 | Murine DDAH 2 amino acid sequence | MGTPGEGLGR CSHALIRGVP ESLASGEGAG AGLPALDLAK AQREHGVLGG KLRQRLGLQL LELPPEESLP LGPLLGDTAV IQGDTALITR PWSPARRPEV DGVRKALQDL GLRIVEMGDE NATLDGTDVL FTGREFFVGL SKWTNHRGAE IVADTFRDFA VSTVPVSGSS HLRGLCGMGG PRTVVAGSSE AAQKAVRAMA ALTDHPYASL TLPDDAASDC LFLRPGLPGA TPFLLHRGGG DLPNSQEALQ KLSDVTLVPV SCSELEKAGA GLSSLCLVLS TRPHC |

TABLE 5

Rat DDAH Sequences

| SEQ ID NO: | Sequence Name | Sequence |
|---|---|---|
| 11 | Rat DDAH1 amino acid sequence | MAGLSHPSVF GRATHAVVRA PPESLCRHAL RRSQGEEVDF ARAERQHQLY VGVLGSKLGL QVVQLPADES LPDCVFVEDV AVVCEETALI TRPGAPSRRK EVDMMKEALE KLQLNIVEMKDENATLDGGD VLFTGREFFV GLSKRTNQRG AEILADTFKD YAVSTVPVAD SLHLKSFCSM AGPNLIAIGS SESAQKALKI |

TABLE 5-continued

Rat DDAH Sequences

| SEQ ID NO: | Sequence Name | Sequence |
|---|---|---|
| | | MQQMSDHRYD KLTVPDDMAA NCIYLNIPSK GHVLLHRTPE EYPESAKVYE KLKDHLLIPV SNSEMEKVDG LLTCCSVFIN KKTDS |
| 12 | Rat DDAH 2 amino acid sequence | MGTPGEGLGR CSHALIRGVP ESLASGEGAG AGLPALDLAK AQREHGVLGG KLRQRLGLQLLELPPEESLP LGPLLGDTAV IQGDTALITR PWSPARRPEV DGVRKALQDL GLRIVEMGDENATLDGTDVL FTGREFFVGL SKWTNHRGAE IVADTFRDFA VSTVPVSGAS HLRGLCGMGGPRTVVAGSSE AAQKAVRAMA ALTDHPYASL TLPDDAASDC LFLRPGLPGT TPFLLHRGGGDLPNSQEALQ KLSDVTLVPV SCSELEKVGA GLSSLCLVLS TRPHC |

TABLE 6

Bacterial DDAH Sequences

| SEQ ID NO: | Sequence Name | Sequence |
|---|---|---|
| 13 | Bacterial DDAH amino acid sequence Pseudomonas aruginosa | MFKHIIARTP ARSLVDGLTS SHLGKPDYAK ALEQHNAYIR ALQTCDVDIT LLPPDERFPDSVFVEDPVLC TSRCAIITRP GAESRRGETE IIEETVQRFY PGKVERIEAP GTVEAGDIMMVGDHFYIGES ARTNAEGARQ MIAILEKHGL SGSVVRLEKV LHLKTGLAYL EHNNLLAAGEFVSKPEFQDF NIIEIPEEES YAANCIWVNE RVIMPAGYPR TREKIARLGY RVIEVDTSEYRKIDGGVSCM SLRF |

TABLE 7

Non-Human Primate DDAH Sequences

| SEQ ID NO: | Sequence Name | Sequence |
|---|---|---|
| 14 | Rhesus Monkey DDAH1 amino acid sequence | MAGLGHPAAF GRATHAVVRA LPESLGQHAL RSAKGEEVDV ARAERQHQLY VGVLGSKLGL QVVELPADES LPDCVFVEDV AVVCEETALI TRPGAPSRRK EVDMMKEALE KLQLNIVEMKDENATLDGGD VLFTGREFFV GLSKRTNQRG AEILADTFKD YAVSTVPVAD GLHLKSFCSMAGPNLIAIGS SESAQKALKI MQQMSDHRYD KLTVPDDIAA NCIYLNIPNK GHVLLHRTPEEYPESAKVYE KLKDHMLIPV SMSELEKVDG LLTCCSVLIN KKVDS |

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively. The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups which are limited to hydrocarbon groups are termed "homoalkyl".

The term "alkylene" by itself or as part of another substituent means a divalent radical derived from an alkane, as exemplified, but not limited, by the structures —$CH_2CH_2$— and —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being a particular embodiment of the methods and compositions described herein. A "lower alkyl" or "lower alkylene" is a shorter chain alkyl or alkylene group, generally having eight or fewer carbon atoms.

The term "amino acid" refers to naturally occurring and non-natural amino acids, as well as amino acid analogs and amino acid mimetics that function in a manner similar to the naturally occurring amino acids. Naturally encoded amino acids are the 20 common amino acids (alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine) and pyrrolysine and selenocysteine Amino acid analogs refers to compounds that have the same basic chemical structure as a naturally occurring amino acid, i.e., an a carbon that is bound to a hydrogen, a carboxyl group, an amino group, and an R group, such as, homoserine, norleucine, methionine sulfoxide, methionine methyl sulfonium. Such analogs have modified R groups (such as, norleucine) or modified peptide backbones, but retain the same basic chemical structure as a naturally occurring amino acid.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

An "amino terminus modification group" refers to any molecule that can be attached to the amino terminus of a polypeptide. By way of example, such terminal amine groups may be at the end of polymeric molecules, where such polymeric molecules include, but are not limited to, polypeptides, polynucleotides, and polysaccharides. Similarly, a "carboxy terminus modification group" refers to any molecule that can be attached to the carboxy terminus of a polypeptide. Terminus modification groups include but are not limited to various water soluble polymers, peptides or proteins such as serum albumin, or other moieties that increase serum half-life of peptides. Terminus modification groups include but are not limited to, various water soluble polymers, peptides or proteins.

A "bifunctional polymer", also referred to as a "bifunctional linker", refers to a polymer comprising two functional groups that are capable of reacting specifically with other moieties to form covalent or non-covalent linkages. Such moieties may include, but are not limited to, the side groups on amino acids or peptides. The other moieties that may be linked to the bifunctional linker or bifunctional polymer may be the same or different moieties. By way of example only, a bifunctional linker may have a functional group reactive with a group on a first peptide, and another functional group which is reactive with a group on a second peptide, whereby forming a conjugate that includes the first peptide, the bifunctional linker and the second peptide.

A "multi-functional polymer" also referred to as a "multi-functional linker", refers to a polymer comprising two or more functional groups that are capable of reacting with other moieties. Such moieties may include, but are not limited to, the side groups on natural or non-natural amino acids or peptides which contain such natural or non-natural amino acids. (including, but not limited to, amino acid side groups) to form covalent or non-covalent linkages. A bi-functional polymer or multi-functional polymer may be any desired length or molecular weight, and may be selected to provide a particular desired spacing or conformation between one or more molecules linked to a compound and molecules it binds to or the compound.

By "modulating biological activity" is meant increasing or decreasing the reactivity of a compound, polypeptide or enzyme, altering the selectivity of the compound, polypeptide or enzyme, enhancing or decreasing the matrix selectivity of the polypeptide or enzyme. Analysis of modified biological activity can be performed by comparing the biological activity of two or more compounds, polypeptides or enzymes.

The term "biomaterial," as used herein, refers to a biologically-derived material, including but not limited to material obtained from bioreactors and/or from recombinant methods and techniques.

The term "biophysical probe" or "biosensor" as used herein, refers to sensors or probes which can detect or monitor changes in molecules including concentration. Such molecules include, but are not limited to, compounds such as ADMA and citrulline, proteins such as DDAH, and may be used to detect or monitor interaction of proteins with other macromolecules.

The term "biotin analogue," or also referred to as "biotin mimic", as used herein, is any molecule, other than biotin, which bind with high affinity to avidin and/or streptavidin.

The term "aryl" means, unless otherwise stated, a polyunsaturated, aromatic, hydrocarbon substituent which can be a single ring or multiple rings (including but not limited to, from 1 to 3 rings) which are fused together or linked covalently. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (including but not limited to, aryloxy, arylthioxy, aralkyl) includes both aryl and heteroaryl rings as defined above. Thus, the term "aralkyl" or "alkaryl" is meant to include those radicals in which an aryl group is attached to an alkyl group (including but not limited to, benzyl, phenethyl, pyridylmethyl and the like) including those alkyl groups in which a carbon atom (including but not limited to, a methylene group) has been replaced by, for example, an oxygen atom (including but not limited to, phenoxymethyl, 2-pyridyloxymethyl, 3-(1-naphthyloxy)propyl, and the like).

A "bifunctional polymer" refers to a polymer comprising two discrete functional groups that are capable of reacting specifically with other moieties (including but not limited to, amino acid side groups) to form covalent or non-covalent linkages. A bifunctional linker having one functional group reactive with a group on a particular biologically active component, and another group reactive with a group on a second biological component, may be used to form a conjugate that includes the first biologically active component, the bifunctional linker and the second biologically active component. Many procedures and linker molecules for attachment of various compounds to peptides are known to those skilled in the art. A "multi-functional polymer" refers to a polymer comprising two or more discrete functional groups that are capable of reacting specifically with other moieties (including but not limited to, amino acid side groups) to form covalent or non-covalent linkages. A bifunctional polymer or multi-functional polymer may be any desired length or molecular weight, and may be selected to provide a particular desired spacing or conformation between one or more molecules linked to the polypeptide and its binding partner or the polypeptide.

The term "biologically active molecule", "biologically active moiety" or "biologically active agent" when used herein means any substance which can affect any physical or biochemical properties of a biological system, pathway, molecule, or interaction relating to an organism.

"Cofolding," as used herein, refers specifically to refolding processes, reactions, or methods which employ at least two polypeptides which interact with each other and result in the transformation of unfolded or improperly folded polypeptides to native, properly folded polypeptides.

A "comparison window," as used herein, includes reference to a segment of any one of the number of contiguous positions selected from the group consisting of from 20 to 600, usually about 50 to about 200, more usually about 100 to about 150 in which a sequence may be compared to a reference sequence of the same number of contiguous positions after the two sequences are optimally aligned. Methods of alignment of sequences for comparison are well-known in the art. Optimal alignment of sequences for comparison can be conducted, including but not limited to, by the local homology algorithm of Smith and Waterman, by the homology alignment algorithm of Needleman and Wunsch, by the search for similarity method of Pearson and Lipman, by computerized implementations of these algorithms (GAP, BESTFIT, FASTA, and TFASTA in the Wisconsin Genetics Software Package, Genetics Computer Group, 575 Science Dr., Madison, WI), or by manual alignment and visual inspection.

One example of an algorithm that is suitable for determining percent sequence identity and sequence similarity are the BLAST and BLAST 2.0 algorithms Software for performing BLAST analyses is publicly available through the National Center for Biotechnology Information. The BLAST algorithm parameters W, T, and X determine the sensitivity and speed of the alignment. The BLASTN program (for nucleotide sequences) uses as defaults a word length (W) of 11, an expectation (E) or 10, M=5, N=−4 and a comparison of both strands. For amino acid sequences, the BLASTP program uses as defaults a word length of 3, and expectation (E) of 10, and the BLOSUM62 scoring matrix alignments (B) of 50, expectation (E) of 10, M=5, N=−4, and a comparison of both strands. The BLAST algorithm is typically performed with the "low complexity" filter turned off.

The BLAST algorithm also performs a statistical analysis of the similarity between two sequences. One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, less than about 0.01, or less than about 0.001.

The term "conservatively modified variants" applies to both amino acid and nucleic acid sequences. With respect to particular nucleic acid sequences, "conservatively modified variants" refers to those nucleic acids which encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of skill will recognize that each codon in a nucleic acid (except ATG, which is ordinarily the only codon for methionine, and TGG, which is ordinarily the only codon for tryptophan) can be modified to yield a functionally identical molecule. Accordingly, each silent variation of a nucleic acid which encodes a polypeptide is implicit in each described sequence.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are known to those of ordinary skill in the art. Such conservatively modified variants are in addition to and do not exclude polymorphic variants, interspecies homologs, and alleles of the methods and compositions described herein.

The following eight groups each contain amino acids that are conservative substitutions for one another:

a. Alanine (A), Glycine (G);

b. Aspartic acid (D), Glutamic acid (E);

c. Asparagine (N), Glutamine (Q);

d. Arginine (R), Lysine (K);

e. Isoleucine (I), Leucine (L), Methionine (M), Valine (V);

f. Phenylalanine (F), Tyrosine (Y), Tryptophan (W);

g. Serine (S), Threonine (T); and h. Cysteine (C), Methionine (M)

(see, e.g., Creighton, *Proteins: Structures and Molecular Properties* (W H Freeman & Co.; 2nd edition (December 1993))

The terms "cycloalkyl" and "heterocycloalkyl", by themselves or in combination with other terms, represent, unless otherwise stated, cyclic versions of "alkyl" and "heteroalkyl", respectively. Thus, a cycloalkyl or heterocycloalkyl include saturated, partially unsaturated and fully unsaturated ring linkages. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. Additionally, the term encompasses bicyclic and tricyclic ring structures. Similarly, the term "heterocycloalkylene" by itself or as part of another substituent means a divalent radical derived from heterocycloalkyl, and the term "cycloalkylene" by itself or as part of another substituent means a divalent radical derived from cycloalkyl.

"Denaturing agent" or "denaturant," as used herein, is defined as any compound or material which will cause a reversible unfolding of a protein. The strength of a denaturing agent or denaturant will be determined both by the properties and the concentration of the particular denaturing agent or denaturant. Suitable denaturing agents or denaturants may be chaotropes, detergents, organic, water miscible solvents, phospholipids, or a combination of two or more such agents. Suitable chaotropes include, but are not limited to, urea, guanidine, and sodium thiocyanate. Useful detergents may include, but are not limited to, strong detergents such as sodium dodecyl sulfate, or polyoxyethylene ethers (e.g. Tween or Triton detergents), Sarkosyl, mild non-ionic detergents (e.g., digitonin), mild cationic detergents such as N->2,3-(Dioleyoxy)-propyl-N,N,N-trimethylammonium, mild ionic detergents (e.g. sodium cholate or sodium deoxycholate) or zwitterionic detergents including, but not limited to, sulfobetaines (Zwittergent), 3-(3-chlolamidopropyl)dimethylammonio-1-propane sulfate (CHAPS), and 3-(3-chlolamidopropyl)dimethylammonio-2-hydroxy-1-propane sulfonate (CHAPSO). Organic, water miscible solvents such as acetonitrile, lower alkanols (especially $C_2$-$C_4$ alkanols such as ethanol or isopropanol), or lower alkandiols (especially $C_2$-$C_4$ alkandiols such as ethylene-glycol) may be used as denaturants. Phospholipids useful in the methods and compositions described herein may be naturally occurring phospholipids such as phosphatidylethanolamine, phosphatidylcholine, phosphatidylserine, and phosphatidylinositol or synthetic phospholipid derivatives or variants such as dihexanoylphosphatidylcholine or diheptanoylphosphatidylcholine.

The term "effective amount" as used herein refers to that amount of the hydrolysis of ADMA in the patient's blood which will relieve to some extent one or more of the symptoms of the disease, condition or disorder being treated.

The terms "enhance" or "enhancing" means to increase or prolong either in potency or duration a desired effect.

As used herein, the term "eukaryote" refers to organisms belonging to the phylogenetic domain Eucarya such as animals (including but not limited to, mammals, insects, reptiles, birds, etc.), ciliates, plants (including but not limited to, monocots, dicots, algae, etc.), fungi, yeasts, flagellates, microsporidia, protists, etc.

The terms "functional group", "active moiety", "activating group", "leaving group", "reactive site", "chemically reactive group" and "chemically reactive moiety" are used in the art and herein to refer to distinct, definable portions or units of a molecule. The terms are somewhat synonymous in the chemical arts and are used herein to indicate the portions of molecules that perform some function or activity and are reactive with other molecules.

The term "halogen" includes fluorine, chlorine, iodine, and bromine.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$—, —S(O)—$CH_3$, —$CH_2$—$CH_2$—S(O)$_2$—$CH_3$, —CH=CH—O—$CH_3$, —Si($CH_3$)$_3$, —$CH_2$—CH=N—O$CH_3$, and —CH=CH—N($CH_3$)—$CH_3$. Up to two heteroatoms may be consecutive, such as, for example, —$CH_2$—NH—O$CH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, the same or different heteroatoms can also occupy either or both of the chain termini (including but not limited to, alkyleneoxy, alkylenedioxy, alkyleneamino, alkylenediamino, aminooxyalkylene, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

The terms "identical" or percent "identity," in the context of two or more nucleic acids or polypeptide sequences, refer to two or more sequences or subsequences that are the same. Sequences are "substantially identical" if they have a percentage of amino acid residues or nucleotides that are the same (i.e., about 60% identity, optionally about 65%, about 70%, about 75%, about 80%, about 85%, about 90%, or about 95% identity over a specified region), when compared and aligned for maximum correspondence over a comparison window, or designated region as measured using one of the following sequence comparison algorithms or by manual alignment and visual inspection. This definition also refers to the complement of a test sequence. The identity can exist over a region that is at least about 50 amino acids or nucleotides in length, or over a region that is 75-100 amino acids or nucleotides in length, or, where not specified, across the entire sequence of a polynucleotide or polypeptide.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters.

The term "isolated," when applied to a nucleic acid or protein, denotes that the nucleic acid or protein is free of at least some of the cellular components with which it is associated in the natural state, or that the nucleic acid or protein has been concentrated to a level greater than the concentration of its in vivo or in vitro production. It can be in a homogeneous state. Isolated substances can be in either a dry or semi-dry state, or in solution, including but not limited to an aqueous solution. It can be a component of a pharmaceutical composition that comprises additional pharmaceutically acceptable carriers and/or excipients. Purity and homogeneity are typically determined using analytical chemistry techniques such as polyacrylamide gel electrophoresis or high performance liquid chromatography. A protein which is the predominant species present in a preparation is substantially purified. In particular, an isolated gene is separated from open reading frames which flank the gene and encode a protein other than the gene of interest. The term "purified" denotes that a nucleic acid or protein gives rise to substantially one band in an electrophoretic gel. Particularly, it may mean that the nucleic acid or protein is at least 85% pure, at least 90% pure, at least 95% pure, at least 99% or greater pure.

The term "linkage" or "linker" or "spacer" is used herein to refer to groups or bonds that normally are formed as the result of a chemical reaction and typically are covalent linkages. The terms "linker" and "spacer" as used herein refer to an organic moiety that connects two parts of a compound. Hydrolytically stable linkages means that the linkages are substantially stable in water and do not react with water at useful pH values, including but not limited to, under physiological conditions for an extended period of time, perhaps even indefinitely. Hydrolytically unstable or degradable linkages mean that the linkages are degradable in water or in aqueous solutions, including for example, blood. Enzymatically unstable or degradable linkages mean that the linkage can be degraded by one or more enzymes. As understood in the art, PEG and related polymers may include degradable linkages in the polymer backbone or in the linker group between the polymer backbone and one or more of the terminal functional groups of the polymer molecule. For example, ester linkages formed by the reaction of PEG carboxylic acids or activated PEG carboxylic acids with alcohol groups on a biologically active agent generally hydrolyze under physiological conditions to release the agent. Other hydrolytically degradable linkages include but are not limited to carbonate linkages; imine linkages resulted from reaction of an amine and an aldehyde; phosphate ester linkages formed by reacting an alcohol with a phosphate group; hydrazone linkages which are reaction product of a hydrazide and an aldehyde; acetal linkages that are the reaction product of an aldehyde and an alcohol; orthoester linkages that are the reaction product of a formate and an alcohol; peptide linkages formed by an amine group, including but not limited to, at an end of a polymer such as PEG, and a carboxyl group of a peptide; and oligonucleotide linkages formed by a phosphoramidite group, including but not limited to, at the end of a polymer, and a 5' hydroxyl group of an oligonucleotide. In one embodiment, the linker is a non-hydrocarbon such as hydrazine, hydroxylamine, ammonia, water, or hydrogen sulfide.

The terms "linkage" or "linker" or "spacer" as used herein also refer to an organic moiety that connects two parts of a compound. In one embodiment, the linker is a saturated or unsaturated aliphatic-chain having from 2 to 18 carbon atoms, 2 to 16 carbon atoms, 2 to 14 carbon atoms, 2 to 12 carbon atoms, or 2 to 10 carbon atoms, 2 to 8 carbon atoms, 2 to 6 carbon atoms, and 2 to 4 carbon atoms. In one embodiment, the linker is a saturated aliphatic chain having 4 to 8 carbon atoms, more preferably 6 carbon atoms. The nucleophilic group of said linker may be located at one of the terminal ends of the aliphatic chain or in between the terminal ends of the aliphatic chain. In one embodiment the nucleophilic group of said linker may be chemically coupled to the aliphatic chain by way of a branch chain extending therefrom. In one embodiment, there are two nucleophilic groups disposed on said linker, preferably at terminal ends of the aliphatic chain. In one embodiment at least one nucleophilic group is disposed on a terminal end of the aliphatic chain and is coupled to either the ether or epoxide-containing moiety with a secondary aliphatic linker chain therebetween. The secondary aliphatic linker chain may have from 1 to 3 carbon atoms.

As used herein, the term "medium" or "media" includes any culture medium, solution, solid, semi-solid, or rigid support that may support or contain any host cell, including bacterial host cells, yeast host cells, insect host cells, plant host cells, eukaryotic host cells, mammalian host cells, CHO cells, prokaryotic host cells, *E. coli*, or *Pseudomonas* host cells, and cell contents. Thus, the term may encompass medium in which the host cell has been grown, e.g., medium into which the polypeptide has been secreted, including medium either before or after a proliferation step. The term also may encompass buffers or reagents that contain host cell lysates, such as in the case where the polypeptide is produced intracellularly and the host cells are lysed or disrupted to release the polypeptide.

A "metabolite" of a substance is a derivative of that substance that is formed when the substance is metabolized. The term "active metabolite" refers to a biologically active derivative of a substance that is formed when the substance is metabolized. The term "metabolized" refers to the sum of the processes (including, but not limited to, hydrolysis reactions and reactions catalyzed by enzymes) by which a particular substance is changed by for example an enzyme.

The term "modified," as used herein refers to the presence of a post-translational modification on a polypeptide.

As used herein, the term "non-eukaryote" refers to non-eukaryotic organisms. For example, a non-eukaryotic organism can belong to the Eubacteria (including but not limited to, *Escherichia coli, Thermus thermophilus, Bacillus stearothermophilus, Pseudomonas fluorescens, Pseudomonas aeruginosa, Pseudomonas putida*, etc.) phylogenetic domain, or the Archaea (including but not limited to, *Methanococcus jannaschii, Methanobacterium thermoautotrophicum, Halobacterium* such as *Haloferax volcanii* and *Halobacterium* species NRC-1, *Archaeoglobus fulgidus, Pyrococcus furiosus, Pyrococcus horikoshii, Aeuropyrum pernix*, etc.) phylogenetic domain.

A "non-natural amino acid" refers to an amino acid that is not one of the 20 common amino acids or pyrrolysine or selenocysteine; other terms that may be used synonymously with the term "non-natural amino acid" is "non-naturally encoded amino acid," "unnatural amino acid," "non-naturally-occurring amino acid," and variously hyphenated and non-hyphenated versions thereof. The term "non-natural amino acid" includes, but is not limited to, amino acids that occur naturally by modification of a naturally encoded amino acid (including but not limited to, the 20 common amino acids or pyrrolysine and selenocysteine) but are not themselves incorporated into a growing polypeptide chain by the translation complex. Examples of naturally-occurring amino acids that are not naturally-encoded include, but are not limited to, N-acetylglucosaminyl-L-serine, N-acetylglucosaminyl-L-threonine, and 0-phosphotyrosine.

The term "nucleic acid" refers to deoxyribonucleotides, deoxyribonucleosides, ribonucleosides or ribonucleotides and polymers thereof in either single- or double-stranded form. Unless specifically limited, the term encompasses nucleic acids containing known analogues of natural nucleotides which have similar binding properties as the reference nucleic acid and are metabolized in a manner similar to naturally occurring nucleotides. Unless specifically limited otherwise, the term also refers oligonucleotide analogs including PNA (peptidonucleic acid), analogs of DNA used in antisense technology (phosphorothioates, phosphoroamidates, and the like). Unless otherwise indicated, a particular nucleic acid sequence also implicitly encompasses conservatively modified variants thereof (including but not limited to, degenerate codon substitutions) and complementary sequences as well as the sequence explicitly indicated. Specifically, degenerate codon substitutions may be achieved by generating sequences in which the third position of one or more selected (or all) codons is substituted with mixed-base and/or deoxyinosine residues.

"Oxidizing agent," as used herein with respect to protein refolding, is defined as any compound or material which is capable of removing an electron from a compound being oxidized. Suitable oxidizing agents include, but are not limited to, oxidized glutathione, cystine, cystamine, oxidized dithiothreitol, oxidized erythreitol, and oxygen. A wide variety of oxidizing agents are suitable for use in the methods and compositions described herein.

As used herein, the term "polyalkylene glycol" refers to polyethylene glycol, polypropylene glycol, polybutylene glycol, and derivatives thereof. The term "polyalkylene glycol" encompasses both linear and branched polymers and average molecular weights of between 1 kDa and 100 kDa. Other exemplary embodiments are listed, for example, in commercial supplier catalogs.

The terms "polypeptide," "peptide" and "protein" are used interchangeably herein to refer to a polymer of amino acid residues. That is, a description directed to a polypeptide applies equally to a description of a peptide and a description of a protein, and vice versa. The terms apply to naturally occurring amino acid polymers as well as amino acid polymers in which one or more amino acid residues is a non-natural amino acid. As used herein, the terms encompass amino acid chains of any length, including full length proteins or fragments thereof, wherein the amino acid residues are linked by covalent peptide bonds.

The term "post-translationally modified" refers to any modification of a natural or non-natural amino acid that occurs to such an amino acid after it has been incorporated into a polypeptide chain. The term encompasses, by way of example only, co-translational in vivo modifications, co-translational in vitro modifications (such as in a cell-free translation system), post-translational in vivo modifications, and post-translational in vitro modifications.

The term "protected" refers to the presence of a "protecting group" or moiety that prevents reaction of the chemically reactive functional group under certain reaction conditions. The protecting group will vary depending on the type of chemically reactive group being protected. For example, if the chemically reactive group is an amine or a hydrazide, the protecting group can be selected from the group of tert-butyloxycarbonyl (t-Boc) and 9-fluorenyl-methoxycarbonyl (Fmoc). If the chemically reactive group is a thiol, the protecting group can be orthopyridyldisulfide. If the chemically reactive group is a carboxylic acid, such as butanoic or propionic acid, or a hydroxyl group, the protecting group can be benzyl or an alkyl group such as methyl, ethyl, or tert-butyl. Other protecting groups known in the art may also be used in or with the methods and compositions described herein, including photolabile groups such as Nvoc and MeNvoc.

By way of example only, blocking/protecting groups may be selected from:

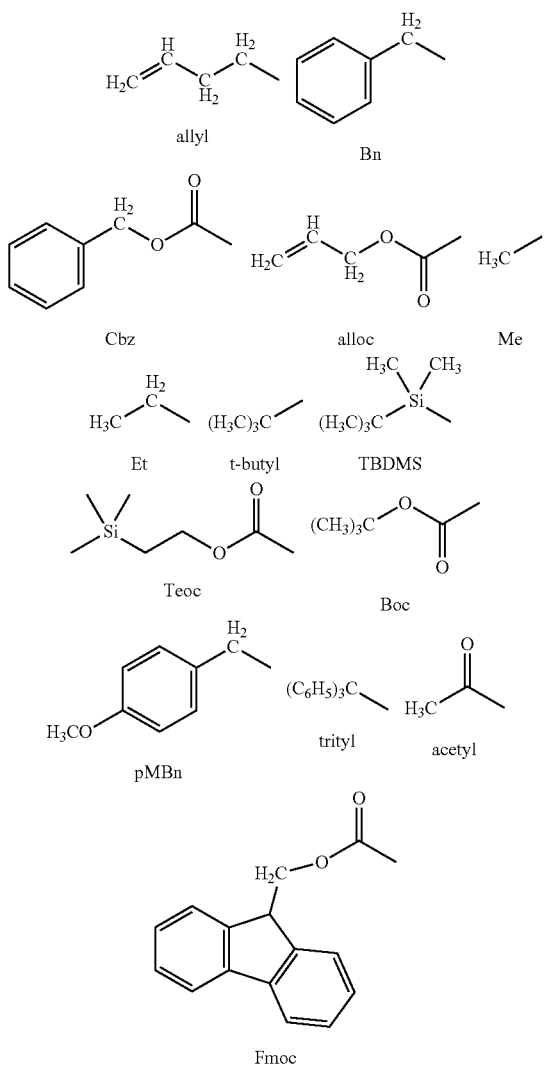

Other protecting groups are described in Greene and Wuts, Protective Groups in Organic Synthesis, 3rd Ed., John Wiley & Sons, New York, NY, 1999, which is incorporated herein by reference in its entirety.

A "recombinant host cell" or "host cell" refers to a cell that includes an exogenous polynucleotide, regardless of the method used for insertion, for example, direct uptake, transduction, f-mating, or other methods known in the art to create recombinant host cells. The exogenous polynucleotide may be maintained as a nonintegrated vector, for example, a plasmid, or alternatively, may be integrated into the host genome.

"Reducing agent," as used herein with respect to protein refolding, is defined as any compound or material which maintains sulfhydryl groups in the reduced state and reduces intra- or intermolecular disulfide bonds. Suitable reducing agents include, but are not limited to, dithiothreitol (DTT), 2-mercaptoethanol, dithioerythritol, cysteine, cysteamine (2-aminoethanethiol), and reduced glutathione. A wide variety of reducing agents are suitable for use in the methods and compositions described herein.

"Refolding," as used herein describes any process, reaction or method which transforms disulfide bond containing polypeptides from an improperly folded or unfolded state to a native or properly folded conformation with respect to disulfide bonds.

The phrase "selectively (or specifically) hybridizes to" refers to the binding, duplexing, or hybridizing of a molecule only to a particular nucleotide sequence under stringent hybridization conditions when that sequence is present in a complex mixture (including but not limited to, total cellular or library DNA or RNA).

The phrase "stringent hybridization conditions" refers to conditions of low ionic strength and high temperature as is known in the art. Typically, under stringent conditions a probe will hybridize to its target subsequence in a complex mixture of nucleic acid (including but not limited to, total cellular or library DNA or RNA) but does not hybridize to other sequences in the complex mixture. Stringent conditions are sequence-dependent and will be different in different circumstances. Longer sequences hybridize specifically at higher temperatures. Generally, stringent conditions are selected to be about 5-10° C. lower than the thermal melting point ($T_m$) for the specific sequence at a defined ionic strength pH. The $T_m$ is the temperature (under defined ionic strength, pH, and nucleic concentration) at which 50% of the probes complementary to the target hybridize to the target sequence at equilibrium (as the target sequences are present in excess, at $T_m$, 50% of the probes are occupied at equilibrium). Stringent conditions may be those in which the salt concentration is less than about 1.0 M sodium ion, typically about 0.01 to 1.0 M sodium ion concentration (or other salts) at pH 7.0 to 8.3 and the temperature is at least about 30° C. for short probes (including but not limited to, 10 to 50 nucleotides) and at least about 60° C. for long probes (including but not limited to, greater than 50 nucleotides). Stringent conditions may also be achieved with the addition of destabilizing agents such as formamide. For selective or specific hybridization, a positive signal may be at least two times background, optionally 10 times background hybridization. Exemplary stringent hybridization conditions can be as following: 50% formamide, 5×SSC, and 1% SDS, incubating at 42° C., or 5×SSC, 1% SDS, incubating at 65° C., with wash in 0.2×SSC, and 0.1% SDS at 65° C. Such washes can be performed for 5, 15, 30, 60, 120, or more minutes.

The term "subject" as used herein, refers to an animal, in some embodiments a mammal, and in other embodiments a human, who is the object of treatment, observation or experiment.

The term "substantially purified" refers to a polypeptide that may be substantially or essentially free of components that normally accompany or interact with the protein as found in its naturally occurring environment, i.e. a native cell, or host cell in the case of recombinantly produced polypeptide. A polypeptide that may be substantially free of cellular material includes preparations of protein having less than about 30%, less than about 25%, less than about 20%, less than about 15%, less than about 10%, less than about 5%, less than about 4%, less than about 3%, less than about 2%, or less than about 1% (by dry weight) of contaminating protein. When the polypeptide or variant thereof is recombinantly produced by the host cells, the protein may be present at about 30%, about 25%, about 20%, about 15%, about 10%, about 5%, about 4%, about 3%, about 2%, or about 1% or less of the dry weight of the cells. When the polypeptide or variant thereof is recombinantly produced by the host cells, the protein may be present in the culture medium at about 5 g/L, about 4 g/L, about 3 g/L, about 2 g/L, about 1 g/L, about 750 mg/L, about 500 mg/L, about 250 mg/L, about 100 mg/L, about 50 mg/L, about 10 mg/L, or about 1 mg/L or less of the dry weight of the cells. Thus, "substantially purified" polypeptide as produced by the methods described herein may have a purity level of at least about 30%, at least about 35%, at least about 40%, at least about 45%, at least about 50%, at least about 55%, at least about 60%, at least about 65%, at least about 70%, specifically, a purity level of at least about 75%, 80%, 85%, and more specifically, a purity level of at least about 90%, a purity level of at least about 95%, a purity level of at least about 99% or greater as determined by appropriate methods such as SDS/PAGE analysis, RP-HPLC, SEC, and capillary electrophoresis.

The term "substituents" includes but is not limited to "non-interfering substituents." "Non-interfering substituents" are those groups that yield stable compounds. Suitable non-interfering substituents or radicals include, but are not limited to, halo, $C_1$-$C_{10}$alkyl, $C_2$-$C_{10}$ alkenyl, $C_2$-$C_{10}$ alkynyl, $C_1$-$C_{10}$alkoxy, $C_5$-$C_{12}$ aralkyl, $C_3$-$C_{12}$ cycloalkyl, $C_4$-$C_{12}$ cycloalkenyl, phenyl, substituted phenyl, toluoyl, xylenyl, biphenyl, $C_2$-$C_{12}$ alkoxyalkyl, $C_5$-$C_{12}$ alkoxyaryl, $C_5$-$C_{12}$ aryloxyalkyl, $C_7$-$C_{12}$ oxyaryl, $C_1$-$C_6$ alkylsulfinyl, $C_1$-$C_{10}$alkylsulfonyl, —$(CH_2)_m$—O—($C_1$-$C_{10}$alkyl) wherein m is from 1 to 8, aryl, substituted aryl, substituted alkoxy, fluoroalkyl, heterocyclic radical, substituted heterocyclic radical, nitroalkyl, —$NO_2$, —CN, —NRC(O)—($C_1$-$C_{10}$alkyl), —C(O)—($C_1$-$C_{10}$alkyl), $C_2$-$C_{10}$ alkthioalkyl, —C(O)O—($C_1$-$C_{10}$alkyl), —OH, —$SO_2$, =S, —COOH, —$NR_2$, carbonyl, —C(O)—($C_1$-$C_{10}$alkyl)-$CF_3$, —C(O)—$CF_3$, —C(O)$NR_2$, —($C_1$-$C_{10}$ aryl)-S—($C_6$-$C_{10}$ aryl), —C(O)—($C_6$-$C_{10}$ aryl), —$(CH_2)_m$—O—$(CH_2)_m$—O—($C_1$-$C_{10}$alkyl) wherein each m is from 1 to 8, —C(O)$NR_2$, —C(S)$NR_2$, —$SO_2NR_2$, —NRC(O)$NR_2$, —NRC(S)$NR_2$, salts thereof, and the like. Each R group in the preceding list is independently selected from the group consisting of H, alkyl or substituted alkyl, aryl or substituted aryl, or alkaryl. Where substituent groups are specified by their conventional chemical formulas, written from left to right, they equally encompass the chemically identical substituents that would result from writing the structure from right to left, for example, —$CH_2O$— is equivalent to —$OCH_2$—.

Substituents for alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to: —OR, =O, =NR, =N—OR, —$NR_2$, —SR, -halogen, —$SiR_3$, —OC(O)R, —C(O)R, —$CO_2R$, —$CONR_2$, —OC(O)$NR_2$, —NRC(O)R, —NR—C(O)$NR_2$, —NR(O)$_2$R, —NR—C(NR$_2$)=NR, —S(O)R, —S(O)$_2$R, —S(O)$_2NR_2$, —NRSO$_2$R, —CN and —$NO_2$ in a number ranging from zero to (2m'+1), where m' is the total number of carbon atoms in such a radical. Each R group in the preceding list is independently selected from the group consisting of hydrogen, substituted or unsubstituted heteroalkyl, substituted or unsubstituted aryl, including but not limited to, aryl substituted with 1-3 halogens, substituted or unsubstituted alkyl, alkoxy or thioalkoxy groups, or aralkyl groups. When two R groups are attached to the same nitrogen atom, they can be combined with the nitrogen atom to form a 5-, 6-, or 7-membered ring. For example, —$NR_2$ is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (including but not limited to, —$CF_3$ and —$CH_2CF_3$) and acyl (including but not limited to, —C(O)$CH_3$, —C(O)$CF_3$, —C(O)$CH_2OCH_3$, and the like).

Similar to the substituents described for the alkyl radical, substituents for aryl and heteroaryl groups are varied and are selected from, but are not limited to —OR, =O, =NR, =N—OR, —$NR_2$, —SR, -halogen, —$SiR_3$, —OC(O)R, —C(O)R, —$CO_2R$, —$CONR_2$, —OC(O)$NR_2$, —NRC(O)R, —NR—C(O)$NR_2$, —NR(O)$_2$R, —NR—C(NR$_2$)=NR, —S(O)R, —S(O)$_2$R, —S(O)$_2NR_2$, —NRSO$_2$R, —CN, —$NO_2$, —R, —$N_3$, —CH(Ph)$_2$, fluoro($C_1$-$C_4$)alkoxy, and fluoro($C_1$-$C_4$)alkyl, in a number ranging from zero to the total number of open valences on the aromatic ring system; and where each R group in the preceding list is independently selected from hydrogen, alkyl, heteroalkyl, aryl and heteroaryl.

The term "treating" is used to refer to either prophylactic and/or therapeutic treatments.

As used herein, the term "water soluble polymer" refers to any polymer that is soluble in aqueous solvents. Linkage of water soluble polymers to a polypeptide can result in changes including, but not limited to, increased or modulated serum half-life, or increased or modulated therapeutic half-life relative to the unmodified form, modulated immunogenicity, modulated physical association characteristics such as aggregation and multimer formation, altered receptor binding, altered binding to one or more binding partners, and altered receptor dimerization or multimerization. The water soluble polymer may or may not have its own biological activity and may be utilized as a linker for attaching the polypeptide to other substances, including but not limited to one or more polypeptides, or one or more biologically active molecules. Suitable polymers include, but are not limited to, polyethylene glycol, polyethylene glycol propionaldehyde, mono C1-C10 alkoxy or aryloxy derivatives thereof (described in U.S. Pat. No. 5,252,714 which is incorporated by reference herein), monomethoxy-polyethylene glycol, polyvinyl pyrrolidone, polyvinyl alcohol, polyamino acids, divinylether maleic anhydride, N-(2-Hydroxypropyl)-methacrylamide, dextran, dextran derivatives including dextran sulfate, polypropylene glycol, polypropylene oxide/ethylene oxide copolymer, polyoxyethylated polyol, heparin, heparin fragments, polysaccharides, oligosaccharides, glycans, cellulose and cellulose derivatives, including but not limited to methylcellulose and carboxymethyl cellulose, starch and starch derivatives, polypeptides, polyalkylene glycol and derivatives thereof, copolymers of polyalkylene glycols and derivatives thereof, polyvinyl ethyl ethers, and alpha-beta-poly[(2-hydroxyethyl)-DL-aspartamide, and the like, or mixtures thereof. Examples of such water soluble polymers include but are not limited to polyethylene glycol and serum albumin.

EMBODIMENTS

A major pathway for elimination of ADMA from the body is through the enzymatic action of DDAH. Elevated levels of ADMA have been found in patients with a wide variety of diseases and conditions such as renal disease, coronary artery disease, congestive heart failure, hypertension, pulmonary hypertension, and in particular end stage renal failure, surgical patients, trauma patients, intensive care unit patients. ADMA levels are also increased in patients with acute kidney injury and contrast induced renal injury. In addition, it has been reported that increased ADMA level is an indicator of risk for cardiovascular-related death.

High levels of ADMA and reduced DDAH are found in patients with preeclampsia which may contribute to hypertension, renal injury, reduced fetal growth and premature birth. High levels of ADMA is associated with erythropoietin resistance.

Thus, there is an urgent need to develop means to reduce ADMA concentration in the blood of patients, in particular patients with preeclampsia, acute heart failure, ICU patients and those receiving hemodialysis treatment for kidney related diseases. The ability to reduce ADMA from the blood of end stage renal disease patients, in conjunction with hemodialysis treatment, by contacting their blood with DDAH or a biologically active fragment thereof is anticipated to reduce ADMA-mediated morbidity and extend life.

A feature of the present disclosure is to provide an immobilized DDAH enzyme that can hydrolyze ADMA into citrulline and other reaction products, which alleviates one or more of the above-mentioned consequences to increased ADMA concentration in the blood.

A further feature of the present disclosure is to provide a composition comprising a covalently immobilized DDAH enzyme in a formation of covalently bound macromolecules.

Another feature of the present disclosure is to provide a composition comprising a covalently immobilized DDAH enzyme that can be dried and stored and retain enzymatic activity.

A further feature of the present disclosure is to provide an immobilized DDAH enzyme that can be utilized in a system for removing ADMA from a biological fluid, including but not limited to blood or blood fractions.

Another feature of the present disclosure is to provide a sorbent cartridge for dialysis wherein the sorbent cartridge comprises immobilized DDAH enzyme on a solid surface, optionally wherein the DDAH enzyme is covalently bound either directly or via a spacer to the solic support.

Another feature of the present disclosure is to provide a method for preparing an immobilized DDAH enzyme that retains ADMA-hydrolyzing enzymatic activity, optionally wherein the immobilized DDAH enzyme is covalently bound to a solid support.

Another feature of the present disclosure is to provide a method for preparing an immobilized DDAH enzyme that can utilize crude (or raw) unpurified forms of the DDAH enzyme whether from a natural source or recombinantly produced.

To achieve the above noted features and in accordance with the purposes of the present disclosure, as embodied and broadly described herein, the present disclosure provides a composition comprising a covalently or non-covalently immobilized DDAH enzyme or modified DDAH and having DDAH enzymatic activity of hydrolyzing ADMA into citrulline and other metabolites. The composition can comprise a DDAH enzyme, a polymer, and a crosslinker. The composition can comprise a formation of covalently or non-covalently bound macromolecules, and the DDAH enzyme can be covalently or non-covalently bound to the crosslinker and also to the polymer or glass comprising solid support. The composition can be dried and then stored under ambient temperature and pressure and yet maintain DDAH enzymatic activity. This type of immobilization can prevent the dissolution of the DDAH enzyme into a liquid phase of, for example, a biological fluid. This type of immobilization can also prevent the displacement of DDAH enzyme from its immobilized state by other chemicals or biochemicals and/or prevent the migration of DDAH enzyme away from the support matrix.

The present disclosure also provides a method for preparing an immobilized DDAH enzyme. The method can comprise forming an aqueous mixture of a polymer and the DDAH enzyme, adding a crosslinker to the aqueous mixture to form a reaction mixture, and maintaining the reaction mixture for a time sufficient to crosslink the reaction mixture in a formation of covalently or non-covalently bound macromolecules. In one embodiment the solid support comprises functionalized groups that can interact with the DDAH polypeptide to form a covalent bond and thus binds the polypeptide to the solid support.

The present disclosure also provides a method for removing ADMA from a biological fluid comprising ADMA including but not limited to blood or blood fractions. The method can comprise treating the biological fluid with a composition comprising a covalently or non-covalently immobilized DDAH enzyme having DDAH enzymatic activity and recovering the biological fluid having reduced concentration of ADMA. The recovered biological fluid may also have increased citrulline concentration due to the hydrolysis of ADMA. Increased citrulline concentration may provide additional advantages to the patient so treated with the matrix comprising immobilized DDAH of the present disclosure. The DDAH enzyme can be immobilized such that it does not dissolve and does not significantly release or migrate into the biological fluid.

The present disclosure provides a sorbent cartridge comprising a covalently or non-covalently immobilized DDAH enzyme having DDAH enzymatic activity in the sorbent cartridge.

The present disclosure also provides a dialysis or plasmapheresis method comprising the steps of: exposing a dialysate containing ADMA to a matrix comprising immobilized DDAH enzyme, and removing the dialysate from said matrix.

The present disclosure also provides a dialyzer for use in a dialysis device, the dialyzer comprising a matrix as described herein comprising immobilizing DDAH. As such, DDAH may be immobilized onto a dialysis membrane such as, for example, a cellulose acetate membrane filter comprised within the dialyzer. There are many other types of matrix to which DDAH may be immobilized, as described in detail herein.

The matrix may further comprise a coating disposed on said matrix, the coating comprising biologically active DDAH enzyme and stabilizing additives. The stabilizing additives may include, but is not limited to, a sugar such as glucose, an organic acid such as ethylenediaminetetraacetic acid, an amino acid such as cysteine, and a sugar acid such as ascorbic acid.

In another embodiment there is provided a sorbent cartridge for use in a dialysis device the sorbent cartridge comprising a matrix having compounds disposed thereon that comprise immobilized DDAH, each compound comprising a first functional group-containing moiety that is chemically coupled to the DDAH and a second functional group-containing moiety that is coupled to the matrix by a linker to immobilize the DDAH to said matrix without substantial loss of DDAH enzymatic activity.

In another embodiment there is provided a dialysis or plasmapheresis method comprising the steps of exposing a dialysate containing ADMA to a matrix having compounds disposed thereon that comprise immobilized DDAH, and removing the dialysate from said DDAH-comprising matrix after at least a portion of said ADMA has been hydrolyzed. In addition, there is no significant release of potentially hazardous substances, therefore the matrix comprising immobilized DDAH is suitable for use in a wide variety of medical applications such as for hemodialysis as well as peritoneal dialysis.

The matrix to which DDAH may be immobilized may be a bead, micro-sized particle, nanosized particle, magnetics beads, a membrane, a mesh, glass, a scaffold or any solid support that is capable of being prepared to immobilize a functional substance including a biological substance such as biologically active DDAH thereon. In one embodiment, the suitable matrix includes but is not limited to a polyester matrix, a polyamide matrix, an epoxy resin matrix, a polyacrylate matrix, a hydroxyl-functionalized matrix sephadex, sepharose, agarose and a polysaccharide-based matrix. The polysaccharide-based matrix may be, for example, cotton linters, cotton pulp, cotton fabrics, cellulose fibers, cellulose beads, cellulose powder, microcrystalline cellulose, cellulose membranes, rayon, cellophane, cellulose acetate, cellulose acetate membranes, chitosan, chitin, dextran derivatives and agarose derivatives. The matrix may also be biocompatible such that when the matrix is implanted into the human body or in conjunction with the human body, for example in dialysis, little or no adverse health effects are elicited.

In one embodiment the immobilized DDAH is used in combination of plasmapheresis system such as hallow fiber membrane or centrifugation plasmapheresis system.

In one embodiment the immobilized DDAH and the hallow fiber membrane are constructed as a wearable device.

In one embodiment the wearable device may use a minipump to circulate blood through the device.

The hallow fiber membrane may have pore size such that the plasma proteins are filtered retaining the blood cells within the hallow fiber.

In one embodiment, the DDAH-comprising matrix may also contain other biologically active substances such as enzymes, for example urease. Advantageously, when DDAH and other enzymes such as urease are immobilized on a matrix, the matrix containing the immobilized enzymes can also be used for dialysis applications such as peritoneal dialysis or hemodialysis. The enzymes in addition to DDAH may also be at least one of, for example but not limited to, uricase, creatininase, lipase, esterase, cellulase, amylase, pectinase, catalase, acylase, penicillin amidase, and proteinase-K.

In another embodiment, the disclosure provides the use of the DDAH-comprising matrix in sensors and biosensors. Such sensors and biosensors can be utilized to detect, monitor, and/or modulate ADMA concentrations in biological fluids such as blood or blood fractions.

An embodiment of the present disclosure is a dimethylarginine dimethylaminohydrolase (DDAH) polypeptide having an amino acid sequence set forth in SEQ ID NO: 1 (DDAH-1) or SEQ ID NO:2 (DDAH-2), and biologically active fragments thereof, wherein said DDAH polypeptide is immobilized onto a matrix. The DDAH polypeptide can hydrolyze assymetric dimethylarginine (ADMA). The DDAH polypeptide may be a full length DDAH-1 or DDAH-2 polypeptide. In one embodiment the DDAH polypeptide is a biologically active fragment or portion of a full length DDAH-1 or DDAH-2 polypeptide. In one embodiment the DDAH polypeptide hydrolyzes ADMA to form citrulline. In one embodiment the DDAH polypeptide hydrolyzes ADMA in solution to form citrulline. In one embodiment the DDAH polypeptide hydrolyzes ADMA in solution to form citrulline, wherein said solution is a body fluid. In one embodiment the DDAH polypeptide hydrolyzes ADMA in solution to form citrulline, wherein said solution is a body fluid, and wherein said body fluid is blood, a blood fraction, or a blood derived fluid. In one embodiment the DDAH polypeptide is produced in a recombinant host cell. In one embodiment the DDAH polypeptide is produced in a recombinant host cell, wherein said recombinant host cell is a prokaryotic cell. In one embodiment the DDAH polypeptide is produced in a recombinant host cell, wherein said recombinant host cell is a bacterium. In one embodiment the DDAH polypeptide is produced in a recombinant host cell, wherein said recombinant host cell is a eukaryotic cell. In one embodiment the DDAH polypeptide is produced in a recombinant host cell, wherein said recombinant host cell is a mammalian cell. In one embodiment the DDAH polypeptide is produced in a recombinant host cell, wherein said recombinant host cell is a yeast cell. In one embodiment the DDAH polypeptide is a recombinant mammalian DDAH polypeptide, optionally a recombinant human DDAH polypeptide. In one embodiment the DDAH polypeptide is isolated from a non-human source. The DDAH polypeptide may be isolated from a bacterial DDAH amino acid sequence *Pseudomonas aruginosa*. The DDAH polypeptide may be isolated from human tissue or human body fluid source.

The DDAH polypeptide may be associated with the matrix by a covalent linkage between the DDAH polypeptide and the matrix. The DDAH polypeptide may be immobilized in matrix by a non-covalent linkage between the DDAH polypeptide and the matrix. In one embodiment the DDAH polypeptide has a structure of Formula I: DDAH-B1-L-B2-M [Formula I]; wherein DDAH is a full length or biologically active fragment of DDAH polypeptide; B1 is a covalent or non-covalent bond; L is a linker, or is absent; B2 is a covalent bond, a non-covalent bond, or is absent; and M is a matrix. In one embodiment the DDAH polypeptide is associated with the matrix by physical entrapment within the matrix. In one embodiment the DDAH polypeptide comprises an amino acid sequence set forth in SEQ ID NO: 1 or SEQ ID NO:2, or biologically active fragment thereof, wherein said DDAH polypeptide is associated with a solid support. The solid support may be a plate, a bead or a fiber, or a membrane. In one embodiment the solid support is a matrix comprised of a resin, a polymer, polystyrene, polyethylene, polypropylene, polyfluoroethylene, polyethyleneoxy, and polyacrylamide, co-polymers and grafts thereof, amberlite, glass, silica, silicon, controlled-pore-glass (CPG), reverse-phase silica, metal, particles, beads, glutaraldehyde crosslinked chitosan-clay beads, chitosan beads, alginate beads, poly(HEMA-EGDMA) beads, strands, precipitates, gels, sol-gels, sheets, tubing, spheres, containers, capillaries, pads, slices, films, plates, dipsticks, slides, magnetic beads or particles, magnetic latex beads, iron oxide particles, glasses, ceramics, plastics, polymers, metals, metalloids, alloys, composites, organics, cellulose, quartz, carbon, alumina, titania, tantalum oxide, germanium, silicon nitride, zeolites, gallium arsenide, gold, platinum, aluminum, copper, titanium, metal alloys, poly(tetra)-fluoroethylene (PTFE), polyvinylidenedifluoride, polycarbonate, polymethylmethacrylate, polyvinylethylene, polyethyleneimine, poly(etherether)ketone, polyoxymethylene (POM), polyvinylphenol, polylactides, polymethacrylimide (PMI), polyatkenesulfone (PAS), polypropylene, polyethylene, polyhydroxyethylmethacrylate (HEMA), polydimethyl-siloxane, polyacrylamide, polyimide, and block-copolymers. The matrix may be selected from a group consisting of h hydrogels, PLLA, polyurethanes, flouropolymers, Polysulfone (PS), Polycarbonate, Polyethersulfone (PES), Polyacrylonitrile (PAN), Polymethylmethacrylate (PMMA), Cellulose triacetatePolyetheretherketone (PEEK), Polytetrafluroethlyne (PTFE), Polypropylene, Algenate, Polylactic acid (PLA), and PLGA. The surface of the matrix may be modified by plasma etching.

Another embodiment of the present disclosure is directed to a method for attaching at least one DDAH polypeptide having an amino acid sequence set forth in SEQ ID NO: 1, or SEQ ID NO:2, or a biologically active fragment thereof, to a matrix by reacting a first reactive group of at least one amino acid of the DDAH polypeptide with a second reactive group that is attached to a matrix, thereby forming a bond and attaching the DDAH polypeptide to the matrix. The first reactive group may be an amino group, a carboxy group, or any of the amino acid side chain functional groups of the DDAH polypeptide. The bond between the DDAH polypeptide and the matrix may be a covalent bond or a non-covalent bond.

A further embodiment of the present disclosure is a method of making a matrix comprising a DDAH polypeptide having an amino acid sequence set forth in SEQ ID NO: 1, or SEQ ID NO:2, or a biologically active fragment thereof, by: providing a matrix comprising one or more binding or reactive moiety; providing a DDAH polypeptide or biologically active fragment thereof comprising one or more binding or reactive moiety, and; contacting the DDAH polypeptide or biologically active fragment thereof with the matrix, whereby the binding or reactive moiety of the matrix binds to or reacts with the binding or reactive moiety of the DDAH polypeptide or fragment thereof to provide a matrix that is associated with the DDAH polypeptide or biologically active fragment thereof. An amino acid of the DDAH polypeptide may react with the binding or reactive moiety of the matrix to bind the DDAH polypeptide to the matrix. An amino acid of the DDAH polypeptide may be bound to or comprises a linker that binds to the binding or reactive moiety of the matrix to bind the DDAH polypeptide to the matrix. An amino acid of the DDAH polypeptide may be bound to the binding or reactive moiety of the matrix by a linker that binds to or reacts with the DDAH polypeptide and also binds to or reacts with the matrix to associate the DDAH polypeptide to the matrix.

Yet another embodiment of the present disclosure is a method for attaching a DDAH polypeptide to a support matrix by providing a DDAH polypeptide having at least one amino acid comprising a first chemical moiety; providing a support matrix comprising a second chemical moiety, providing a linker, where the linker comprises a third and fourth chemical moieties, and combining the DDAH polypeptide, the linker, and the support matrix under conditions whereby the first chemical moiety on the DDAH polypeptide attaches to the third chemical moiety on the linker and the second chemical moiety on the support matrix attaches to the fourth chemical moiety on the linker, thereby forming a bridge between the DDAH polypeptide and the support matrix and attaching the DDAH polypeptide to the support matrix. The linker may be reacted with the DDAH polypeptide prior to reaction with the support matrix. The linker may be reacted with the support matrix prior to reaction with the DDAH polypeptide. The attachment between the first chemical moiety on the DDAH polypeptide and the third chemical moiety on the linker may be a covalent attachment or a non-covalent attachment. The attachment between the second chemical moiety on the support matrix and the fourth chemical moiety on the linker may be a covalent attachment or a non-covalent attachment. The attachment between the first and third chemical moieties may be non-covalent and comprises an avidin, streptavidin or neutravidin to biotin coupling. The linker may be a polymer. The linker may be selected from a group consisting of polyethylene glycol, polyethylene glycol propionaldehyde, mono C1-C10 alkoxy or aryloxy derivatives thereof, monomethoxy-polyethylene glycol, polyvinyl pyrrolidone, polyvinyl alcohol, polyamino acids, divinylether maleic anhydride, N-(2-Hydroxypropyl)-methacrylamide, dextran, dextran derivatives including dextran sulfate, polypropylene glycol, polypropylene oxide/ethylene oxide copolymer, polyoxyethylated polyol, heparin, heparin fragments, polysaccharides, oligosaccharides, glycans, cellulose and cellulose derivatives, including but not limited to methylcellulose and carboxymethyl cellulose, starch and starch derivatives, polypeptides, polyalkylene glycol and derivatives thereof, copolymers of polyalkylene glycols and derivatives thereof, polyvinyl ethyl ethers, and alpha-beta-poly[(2-hydroxyethyl)-DL-aspartamide, serum albumin, and mixtures thereof. The polymer surface may be modified by plasma etching and functionalized for DDAH cross linking.

Another embodiment of the present disclosure is a method for reducing ADMA concentration in a fluid by contacting a fluid comprising ADMA with a matrix comprising immobilized DDAH polypeptide having an amino acid sequence set forth in SEQ ID NO: 1, or SEQ ID NO: 2, or biologically active fragment thereof, under suitable conditions and for sufficient time for DDAH to enzymatically produce citrulline from ADMA matrix, thereby reducing the concentration of ADMA in said fluid and tissues. The fluid may be a biological fluid. The biological fluid may be blood. The biological fluid may be a blood fraction, or a blood derived fluid. The method may further include the step of adding L-agrinine and/or citrulline to said fluid.

One more embodiment of the present disclosure is a method for reducing ADMA concentration and increasing citrulline concentration in a fluid by contacting a fluid comprising ADMA with a matrix comprising immobilized DDAH polypeptide or biologically active fragment thereof, under suitable conditions and for sufficient time for DDAH to enzymatically produce citrulline from ADMA matrix, thereby reducing the concentration of ADMA and increasing concentration of citrulline in said fluid. The fluid may be a biological fluid. The biological fluid may be blood. The biological fluid may be a blood fraction, or a blood derived fluid, or a blood derived fluid. The method may further include the step of adding L-arginine to or citrulline to said fluid. Another embodiment of the present disclosure is a method for reducing ADMA concentration in blood or a blood fraction, or a blood derived fluid by contacting said blood or blood fraction comprising ADMA with a matrix comprising immobilized DDAH polypeptide having an amino acid sequence set forth in SEQ ID NO: 1, or SEQ ID NO:2, or biologically active fragment thereof, under suitable conditions and for sufficient time for DDAH to hydrolyze said ADMA, thereby reducing the concentration of ADMA in said blood or blood fraction.

A further embodiment of the present disclosure is a method for reducing ADMA concentration in blood or a blood fraction, or a blood derived fluid by contacting said blood or blood fraction comprising ADMA with a matrix comprising immobilized DDAH polypeptide having an amino acid sequence set forth in SEQ ID NO: 1, or SEQ ID NO:2, or biologically active fragment thereof, under suitable conditions and for sufficient time for DDAH to enzymatically produce citrulline from ADMA matrix, thereby reducing the concentration of ADMA in said fluid. Even another embodiment of the present disclosure is a method for reducing ADMA concentration and increasing citrulline concentration in blood or a blood fraction, or a blood derived fluid by contacting said blood or blood fraction comprising ADMA with a matrix comprising immobilized DDAH polypeptide having an amino acid sequence set forth in SEQ ID NO: 1, or SEQ ID NO:2, or biologically active fragment thereof, under suitable conditions and for sufficient time for DDAH to enzymatically produce citrulline from ADMA, thereby reducing the concentration of ADMA and increasing concentration of citrulline in said fluid.

An additional embodiment of the present disclosure is a method for reducing ADMA concentration, increasing citrulline concentration and increasing L-arginine concentration in blood or a blood fraction, or a blood derived fluid by contacting said blood or blood fraction comprising ADMA with a matrix comprising immobilized DDAH polypeptide having an amino acid sequence set forth in SEQ ID NO: 1, or SEQ ID NO:2, or biologically active fragment thereof, under suitable conditions and for sufficient time for DDAH to enzymatically produce citrulline from ADMA matrix, thereby reducing the concentration of ADMA and increasing concentration of citrulline in said fluid, and further comprising adding L-arginine to said blood or blood fraction. The method may be performed extracorporeally using blood or a blood fraction, or a blood derived fluid from a patient having a disease or condition that is associated with high ADMA concentration. The blood or blood fraction may be returned to said patient. The blood or blood fraction may be from a hemodialysis patient. The blood or blood fraction may be from a kidney disease patient, a heart disease patient, decompensated heart failure patients, diuretic resistant heart failure patients, patients using contrast during surgery, a sepsis patient, liver failure patients, a malaria patient, a sickle cell patient, a trauma patient, and a Mediterranean fever patient, preeclampsia patients, erythropoietin resistant patients, cardiac or non cardiac surgical patients, blood transfusion patients. The blood or blood fraction may be from a heart disease patient.

An embodiment of the present disclosure is a reaction container comprising a DDAH polypeptide or biologically active fragment thereof associated with a matrix, wherein said matrix is inside said container, wherein said container comprises at least one opening or port to add and/or remove a fluid, thereby allowing the fluid to come into contact with the DDAH polypeptide associated with the matrix. The matrix may be a solid support. The solid support may be a plate, a bead, a magnetic bead, a membrane, or a fiber. The solid support may be a flexible sheet formed into a pouch. The solid support may comprise one or more materials selected from a group consisting of resin, a polymer, polystyrene, polyethylene, polypropylene, polyfluoroethylene, polyethyleneoxy, and polyacrylamide, co-polymers and grafts thereof, glass, silica, silicon, controlled-pore-glass (CPG), reverse-phase silica, metal, particles, beads, strands, precipitates, gels, sol-gels, sheets, tubing, spheres, containers, capillaries, pads, slices, films, plates, dipsticks, slides, magnetic beads or particles, magnetic latex beads, iron oxide particles, glasses, ceramics, plastics, polymers, metals, metalloids, alloys, composites, organics, quartz, carbon, alumina, titania, tantalum oxide, germanium, silicon nitride, zeolites, gallium arsenide, gold, platinum, aluminum, copper, titanium, metal alloys, poly(tetra)-fluoroethylene (PTFE), polyvinylidenedifluoride, polycarbonate, polymethylmethacrylate, polyvinylethylene, polyethyleneimine, poly(etherether)ketone, polyoxymethylene (POM), polyvinylphenol, polylactides, polymethacrylimide (PMI), polyatkenesulfone (PAS), polypropylene, polyethylene, polyhydroxyethylmethacrylate (HEMA), polydimethyl-siloxane, polyacrylamide, polyimide, and block-copolymers. PLLA, polyurethanes, flouropolymers, Polysulfone (PS), Polycarbonate, Polyethersulfone (PES), Polyacrylonitrile (PAN), Polymethylmethacrylate (PMMA), Cellulose triacetate, Polyetheretherketone (PEEK), Polytetrafluroethlyne (PTFE), Polypropylene, Algenate, Polylactic acid (PLA), PLGA. The DDAH polypeptide or biologically active fragment thereof may be associated with a matrix, wherein the DDAH polypeptide or biologically active fragment thereof is mixed with a fluid comprising ADMA. The fluid may be a biological fluid. The biological fluid may be blood, the biological fluid may be a blood fraction, or a blood derived fluid. The DDAH polypeptide or biologically active fragment thereof may be mixed with a fluid comprising ADMA wherein said reaction mixture is within a reaction container.

It is to be understood that the methods and compositions described herein and incorporated by reference are not limited to the particular methodology, protocols, devices, procedures, cell lines, constructs, and reagents described herein, and as such may vary. It is also to be understood that the terminology used herein is for the purpose of describing particular embodiments only, and is not intended to limit the scope of the devices, matrix, linkers, chemistry, production, purification, conjugation, methods and compositions described herein, which will be limited only by the appended claims.

Example 1

Recombinant Expression and Purification of Human DDAH

Methods for cloning DDAH are known to those of ordinary skill in the art as are polypeptide and polynucleotide sequences for DDAH and cloning of DDAH into host cells. cDNA encoding human DDAH 1 and DDAH 2 are shown as SEQ ID NO: 3 and SEQ ID NO:4 and the human DDAH 1 and DDAH 2 polypeptide amino acid sequences are shown as SEQ ID NO: 1 and SEQ ID NO:2. Non-human amino acid sequences for DDAH polypeptides are shown in SEQ ID NO:6; 7; 9; 10; 11; 12; 13; and 14. The transformation of *E. coli* with plasmids containing the DDAH or modified DDAH or DDAH analog nucleotide sequences allows for biosynthesis of the DDAH polypeptide.

Wild type mature DDAH is amplified by PCR from a cDNA synthesis reaction using standard protocols and cloned into pET30 (NcoI-BamHI). Prior to or alternatively following sequence confirmation, DDAH encoding nucleic acid sequences are subcloned into an expression vector under constitutive or inducible control of a synthetic promoter derived from *E. coli* or other suitable source. Expression of DDAH is under control of the T7 promoter. Any desired mutations are introduced using standard quick change mutation protocols (Stratagene; La Jolla, California). Constructs are sequence verified.

Expression plasmids (e.g. pET and pBAD) are used to transform into the *Escherichia coli* strain W3110B57 to produce strains of *E. coli* in which expression of the T7 polymerase is under control of an arabinose-inducible promoter. Overnight bacterial cultures are diluted 1:100 into shake flasks containing 2×YT culture media and grown at 37° C. to an $OD_{600}$ of ~0.8. Protein expression is induced by the addition of arabinose (0.2% final). Cultures are incubated at 37° C. for 5 hours or overnight. Cells are pelleted and resuspended in B-PER lysis buffer (Pierce) 100 ul/OD/ml+10 ug/ml DNase and incubated at 37° C. for 30 min. Cellular material is removed by centrifugation and the supernatant removed. The pellet is re-suspended in an equal amount of SDS-PAGE protein loading buffer. All samples are loaded on a 4-12% PAGE gel with MES and DTT. Methods for purification of DDAH are known to those of ordinary skill in the art and are confirmed by SDS-PAGE, Western Blot analyses, or electrospray-ionization ion trap mass spectrometry and the like.

His-tagged mutant DDAH proteins can be purified using methods known to those of ordinary skill in the art. The ProBond Nickel-Chelating Resin (Life Technologies, Carlsbad, CA) may be used via the standard His-tagged protein purification procedures provided by the manufacturer. Functional measurements of the proteins may be done through methods known in the art, methods provided within this application and incorporated references, and alternatively an ELISA on live cells can be developed to assess DDAH polypeptides of the present disclosure.

Example 2

Expression of DDAH Polypeptides by *E. coli*.

*Escherichia coli* strain W3110 is used to produce a wild-type or modified DDAH. A single research cell bank (RCB) vial is removed from −80° C. and thawed at room temperature, then 50 μL is used to inoculate 50 mL of Seed Media (a chemically defined medium) supplemented with 50 μg/mL kanamycin sulfate in a 250 mL baffled Erlenmeyer flask. The primary seed culture is grown for approximately 18 hours at 37° C. and 250 rpm (1-inch throw). The primary seed culture is sub-cultured into a secondary seed culture to an optical density measured at 600 nm wavelength (OD600) of 0.05 in a 500 mL baffled Erlenmeyer flask containing 100 mL of Seed Medium supplemented with 50 μg/mL kanamycin sulfate. The secondary seed culture is grown at 37° C. and 250 rpm (1-inch throw) for approximately 8 hours or when the OD600 reached between 2 and 4.

Sartorius Biostat B 5-L vessels are filled with 2.1-L of Production Media (a chemically defined medium) supplemented with 50 μg/L of kanamycin sulfate. Secondary seed cultures are used to inoculate the fermentors to an initial OD600 of 0.035. The cultures are grown 37° C. and the dissolved oxygen is set to maintain 30% (air saturation) with a primary agitation (480-1200 rpm) cascade and a secondary 02 cascade. An air flow rate of 5 LPM with 6 psi back pressure is maintained throughout the fermentation. The pH of the culture is set at 7.2±0.05 with the addition of 15% ammonium hydroxide and Dow Chemical P2000 antifoam is added as needed for foam control. When the culture reaches an OD600 of between 35±5 (when the initial glycerol in the batch medium is nearly depleted), a bolus feed of 200 mL is given initiated and at the same time the pH set point is adjusted from 7.2 to 6.6. After the initial bolus feed, a continuous feed is initiated at a rate of 0.25 mL/L/min and continues until harvest. The expression of DDAH protein is induced by adding L-arabinose to a concentration of 2 g/L (final culture volume). The culture is grown 6 hours or more after arabinose addition and harvested.

Example 3

DDAH activity is determined by modification of method published in the art (Markus Knipp and Milan Vasˇaˊk Analytical Biochemistry 286, 257-264 (2000). The enzyme activity in cell extracts generated by homogenization in 0.1 M sodium phosphate buffer pH 6.2 and purified preparations will be determined by L-citrulline generation from ADMA. A 100 μl of sample will be transferred to a tubes and 400 μl of 1 mM ADMA in sodium phosphate buffer will be added and incubated at 37° C. for 45 min. The reaction will be terminated by addition of 500 μl of 4% Sulfosalicyclic acid. The mixture will be centrifuged at 3000 g for 10 minutes. A 60 μl of supernatant will be transferred to NUNC 96 well plate in triplicates. A 200 μl of COLDER (color development regent) will be added. COLDER is prepared by mixing 1 volume of solution A [80 mM DAMO (diacetyl monoxime) and 2.0 mM TSC (thiosemicarbazide)] and 3 volume of solution B [3 M H3PO4, 6 M H2SO4, and 2 mM NH4Fe (SO4)2]. The plates will be sealed and heated at 95° C. for 20 minutes. After cooling, they will be read at 530 nM. DDAH activity will be expressed as μM citruline produced per gram protein per minute at 37° C.

Using the above assay, the DDAH and modified DDAH enzyme activity will be characterized for concentration response, substrate concentration response, time course and Km. Enzyme stability will be determined under different temperature and storage conditions. The DDAH polypeptide may comprise amino acid modifications that affect or modulate one or more biological properties of the enzyme, including but not limited to, higher or lower enzymatic activity, increased or decreased stability of the polypeptide either pre- or post-attachment to the matrix, and modified time-action properties of the enzyme. The matrix of the present disclosure having DDAH polypeptides or modified DDAH polypeptides attached thereto may exhibit, for example, decreased enzymatic activity, but greater stability or time action properties than an unmodified or free unattached DDAH polypeptide. The desired levels of enzymatic activity after attachment of the DDAH polypeptide to the matrix may be determined and adjusted, for example, by utilizing different means to attach the DDAH to the matrix, or by using a modified DDAH polypeptide that has the desired activity and/or stability property. In many instances it may be expected that the DDAH enzymatic activity will be reduced after chemical attachment to the matrix. This loss of activity may be mitigated through the use, for example, of a modified DDAH polypeptide that is designed for the particular chemical attachment process.

Elisa assay to measure DDAH concentration in serum, concentrations of recombinant human DDAH, PEGylated recombinant human DDAH, or Acylated recombinant human DDAH in animal serum are measured by an electrochemiluminescence (ECL) method on a Meso Scale Discovery (MSD) platform. The assay comprised of five incubation steps: (1) overnight capture antibody coating, (2) blocking for 2 hours, (3) overnight sample incubation, (4) biotinylated detection antibody incubation for 1 hour, and (5) Sulfo-TAG-labeled streptavidin incubation for 1 hour. A wash step using PBS containing 0.05% Tween 20 is performed between each incubation step. On the first day, MSD high-bind plates (MSD, Gaithersburg, MD) are coated with rat anti-human DDAH mAb overnight at 4° C. On the second day, plates coated with the capture antibody are blocked with I-Block buffer (0.2% I-Block/PBS/0.1% Tween-20) for 2 hours at 22° C. The test samples are thawed at room temperature, mixed well and analyzed at 5% minimum required dilution in 0.2% I-Block/PBS/0.1% Tween-20/5% normal CD-1 mouse serum buffer with additional dilutions in neat serum if needed. Quality controls (QCs) and calibrators are prepared using the same lot of WT DDAH as the one used in studies. Prepared samples, QCs and calibrators are incubated overnight at 4° C. to allow the binding of analyte on the plates. On the third day, the captured WT DDAH is detected using biotinylated rabbit anti-human DDAH polyclonal Ab followed by Sulfo-TAG-labeled streptavidin (Cat. #R32AD-1, lot #WO0139235, MSD, Gaithersburg, MD). Following addition of MSD read buffer (MSD, Gaithersburg, MD), the luminescence intensity is measured with an MSD Sector Imager 2400 (MSD, Gaithersburg, MD). Standard curves and QCs are evaluated using acceptance criteria for accuracy and precision of <20%.

Test samples are quantified using a 4-parameter logistic (4-PL) fit regression model derived from the calibrators using Softmax Pro 5.4.1 Software (Molecular Devices, Sunnyvale, CA). An exemplary standard curve ranged from 3.15 to 112 ng/mL in neat animal serum.

Example 4

Currently, no pharmacological therapy is available to prevent or treat preeclampsia. Development of therapy will have major impact on maternal and fetal mortality and morbidity. The common underlying pathology of preeclampsia includes vascular dysfunction, aberrant vascular remodeling, placental perfusion deficiency and ischemia (8-10). It is widely recognized that nitric oxide (NO) plays an important role in the vascular pathogenesis of preeclampsia (11-14). NO is a critical molecule for maternal and fetal vascular health, placental blood flow, angiogenesis, trophoblast invasion and implantation. Impairment of NO causes vasoconstriction, platelet aggregation, vascular inflammation, and mitochondrial dysfunction leading to renal dysfunction, proteinuria, and cardiovascular disease. NO bioavailability is diminished in preeclampsia patients. Consistent with the observations in patients, inhibition of NO synthesis in animal models leads to preeclampsia phenotype with increased maternal blood pressure, proteinuria and impaired kidney function. More importantly, several preclinical studies have shown that treatment with PDE5 inhibitors sildenafil or tadalafil to increase NO signaling improves fetal growth and maternal blood pressure and renal function in preeclampsia.

Initial clinical studies with sildenafil and tadalafil have produced promising results. Unfortunately, further studies with sildenafil have resulted in significant safety concerns. In the most recent trial, there was significantly higher infant mortality and the investigation with sildenafil in pregnancy was terminated. Thus, although the preclinical and clinical studies have produced proof of therapy by improving NO bioavailability, the safety risk of pharmacological therapy has been the fundamental roadblock. Therefore, development of innovative approaches to safely improve NO bioavailability in preeclampsia patients are critically needed.

In accordance with one embodiment a therapeutic approach is provided wherein the concentration of an endogenous inhibitor of NO synthesis, asymmetric dimethyl arginine (ADMA) is lowered. ADMA is a known cardiotoxin. Abnormally high levels of ADMA circulate in the blood of preeclampsia patients. Meta-analysis of 11 studies with 1338 pregnant women showed that as early as 20 weeks of gestation, the circulating levels of ADMA were significantly higher in women who subsequently developed preeclampsia as compared with those did not (20). Endothelial dysfunction and elevation of ADMA are early pathophysiological features of preeclampsia. The increase in ADMA preceding the onset of preeclampsia suggests its potential role in the pathogenesis of preeclampsia (21). These data also suggest that ADMA level may be a marker for early identification of pregnant women who are at risk for preeclampsia. Endothelial dysfunction and elevation of ADMA preceding the onset of preeclampsia are considered potential pathological mechanism contributing to the complications of preeclampsia.

In accordance with one embodiment ADMA is lowered by using an extracorporeal device. ADMA is removed by a bead novel matrix that contains a DDAH or derivative. A cartridge of the beads containing DDAH is fabricated as a device. Flow of blood or plasma through the cartridge will result in a selective removal of ADMA without exposing the patient to drug material and thereby offering a highly safe therapy.

We have developed a proprietary matrix containing DDAH designated as Therapeutic Extracorporeal Medical device, A prototype extracorporeal cartridge using immobilized DDAH has been fabricated and feasibility studies for lowering ADMA have been completed. Further, we have conducted proof of concept studies to demonstrate that lowering of ADMA in animal models reduced blood pressure in hypertensive rats and improved kidney function in an acute kidney injury model.

Renal dysfunction is another critical clinical manifestation of preeclampsia. Therefore, we tested the effect of ADMA lowering in a rat model of acute kidney injury. Kidney injury in rats was produced by 40 min of ischemia by bilateral renal artery ligation and then reperfusion. These studies showed that ADMA lowering results in improved kidney function.

A prototype Therapeutic Extracorporeal Medical Device (TEMD) device containing ADMA removing matrix was fabricated. Removal of ADMA from human, pig and rat plasma in vitro was studied using various device sizes and flow rates. An example of the experimental data from a study is presented in Table 8. Solution or plasma containing ADMA was applied to TEMD device. Levels of ADMA was determined in the starting material and the eluent from the cartridge. The data show that ADMA was effectively removed upon circulation of plasma through the TEMD device. As expected, the removal of ADMA was dependent upon the duration of interaction between ADMA and TEMD. Thus, 100% of the 20 ug ADMA present in plasma was removed at 0.16 ml/min flow rate using a device containing 1 ml TEMD Increasing the flow rate to 0.5 ml/min resulted in removal of 10 ug of ADMA or 50% of that applied to the cartridge. Thus, ADMA lowering can be controlled by the size of the cartridge and the flow rate.

TABLE 8

ADMA lowering using the prototype TEMD

| TEMD Device Dimension | Flow rate | ADMA removed | % ADMA lowering |
|---|---|---|---|
| 1.0 ml | 0.16 ml/min | 20 ug | 100 |
| 1.0 ml | 0.5 ml/min | 10 ug | 50 |

We have used the data from a small prototype to estimate the scale up necessary for pig or human. For example, based on an average total plasma volume of 3000 ml in human and 2 uM (404 ug/l) ADMA, we expect a total target lowering of 606 ug ADMA to achieve 50% reduction. Assuming the above flow rate, the expected scale up of 60 fold will be required. These approximations would be optimized based on the flow rate requirements of the plasmapheresis system.

Iteration of device size and flow rate will be used to achieve optimum device size for the pig study. These proof of feasibility studies will be the basis for scale up and the device parameters will be refined to achieve target lowering of ADMA. Based on the reduction of ADMA lowering using a 1 ml device, a 40-60 fold scale up is projected for the pig studies.

The Ossabaw pig model of metabolic syndrome will be used for the refinement and optimization of the TEMD device. This model has been well characterized for development of metabolic syndrome, diabetes, hypertension and cardiovascular disease when subjected to high fat diet. We have shown that the ADMA metabolizing activity in this pig model is significantly reduced.

Example 5

Reduction of ADMA will improve NO bioavailability and alleviate the complications of preeclampsia. In order to develop the proof of concept and a prototype medical device, we have cloned and expressed the ADMA metabolizing enzyme, dimethylarginine dimethylaminohydrolase (rDDAH) in *E. coli*. The rDDAH reduced ADMA in blood and lowered blood pressure in hypertensive rats. rDDAH was immobilized on bead matrix and incorporated into a cartridge. The immobilized DDAH was fully effective in reducing ADMA from plasma. A prototype extracorporeal device consisting of a hollow fiber membrane to separate plasma from blood and the DDAH cartridge was constructed.

---

The invention claimed is:

1. An ex vivo method for reducing ADMA in patients on dialysis, in ICU and disease states including kidney disease, acute kidney injury, sepsis, lung injury, preeclampsia, said method comprising the step of
    contacting the patient's blood or plasma with a biologically active DDAH polypeptide covalently linked to a solid support of a therapeutic extracorporeal medical device, wherein the biologically active DDAH polypeptide comprises SEQ ID NO:13, wherein contact of the patient's blood or plasma with said DDAH polypeptide results in degradation of ADMA present in the patient's blood or plasma; and
    returning the contacted blood or plasma to the circulation of the patient.

2. The method of claim 1, wherein the solid support comprises a matrix of insoluble materials, wherein the biologically active DDAH polypeptide is covalently linked to the matrix.

3. The method of claim 1, wherein the solid support is in particulate form.

4. The method of claim 1, wherein the solid support is a monolithic strip, membrane, or sheet.

5. The method of claim 1, wherein the solid support comprises a plurality of biologically active DDAH polypeptides covalently linked to beads, wherein the beads are held in a column, wherein said column is configured for use as a component of a larger extracorporeal device that directs the flow of blood from a patient into contact with the plurality of biologically active DDAH polypeptides covalently linked on the solid support.

6. The method of claim 1, wherein the solid support is porous and the biologically active DDAH polypeptide is immobilized on the surface of the solid support throughout the external and internal spaces of said solid support.

7. The method of claim 1, wherein the therapeutic extracorporeal medical device is configured as a cartridge.

8. The method of claim 1, wherein the therapeutic extracorporeal medical device is integrated into a plasmapheresis system.

* * * * *

SEQUENCE LISTING

<160> NUMBER OF SEQ ID NOS: 14

<210> SEQ ID NO 1
<211> LENGTH: 285
<212> TYPE: PRT
<213> ORGANISM: Homo sapiens

<400> SEQUENCE: 1

```
Met Ala Gly Leu Gly His Pro Ala Ala Phe Gly Arg Ala Thr His Ala
1               5                   10                  15

Val Val Arg Ala Leu Pro Glu Ser Leu Gly Gln His Ala Leu Arg Ser
            20                  25                  30

Ala Lys Gly Glu Glu Val Asp Val Ala Arg Ala Glu Arg Gln His Gln
        35                  40                  45

Leu Tyr Val Gly Val Leu Gly Ser Lys Leu Gly Leu Gln Val Val Glu
    50                  55                  60

Leu Pro Ala Asp Glu Ser Leu Pro Asp Cys Val Phe Val Glu Asp Val
65                  70                  75                  80

Ala Val Val Cys Glu Glu Thr Ala Leu Ile Thr Arg Pro Gly Ala Pro
                85                  90                  95

Ser Arg Arg Lys Glu Val Asp Met Met Lys Glu Ala Leu Glu Lys Leu
            100                 105                 110

Gln Leu Asn Ile Val Glu Met Lys Asp Glu Asn Ala Thr Leu Asp Gly
        115                 120                 125

Gly Asp Val Leu Phe Thr Gly Arg Glu Phe Phe Val Gly Leu Ser Lys
    130                 135                 140

Arg Thr Asn Gln Arg Gly Ala Glu Ile Leu Ala Asp Thr Phe Lys Asp
145                 150                 155                 160

Tyr Ala Val Ser Thr Val Pro Val Ala Asp Gly Leu His Leu Lys Ser
                165                 170                 175

Phe Cys Ser Met Ala Gly Pro Asn Leu Ile Ala Ile Gly Ser Ser Glu
            180                 185                 190

Ser Ala Gln Lys Ala Leu Lys Ile Met Gln Gln Met Ser Asp His Arg
        195                 200                 205

Tyr Asp Lys Leu Thr Val Pro Asp Asp Ile Ala Ala Asn Cys Ile Tyr
    210                 215                 220

Leu Asn Ile Pro Asn Lys Gly His Val Leu Leu His Arg Thr Pro Glu
225                 230                 235                 240

Glu Tyr Pro Glu Ser Ala Lys Val Tyr Glu Lys Leu Lys Asp His Met
                245                 250                 255

Leu Ile Pro Val Ser Met Ser Glu Leu Glu Lys Val Asp Gly Leu Leu
            260                 265                 270
```

Thr Cys Cys Ser Val Leu Ile Asn Lys Lys Val Asp Ser
            275                 280                 285

<210> SEQ ID NO 2
<211> LENGTH: 285
<212> TYPE: PRT
<213> ORGANISM: Homo sapiens

<400> SEQUENCE: 2

Met Gly Thr Pro Gly Glu Gly Leu Gly Arg Cys Ser His Ala Leu Ile
1               5                   10                  15

Arg Gly Val Pro Glu Ser Leu Ala Ser Gly Glu Gly Ala Gly
            20                  25                  30

Leu Pro Ala Leu Asp Leu Ala Lys Ala Gln Arg Glu His Gly Val Leu
            35                  40                  45

Gly Gly Lys Leu Arg Gln Arg Leu Gly Leu Gln Leu Leu Glu Leu Pro
        50                  55                  60

Pro Glu Glu Ser Leu Pro Leu Gly Pro Leu Leu Gly Asp Thr Ala Val
65              70                  75                  80

Ile Gln Gly Asp Thr Ala Leu Ile Thr Arg Pro Trp Ser Pro Ala Arg
                85                  90                  95

Arg Pro Glu Val Asp Gly Val Arg Lys Ala Leu Gln Asp Leu Gly Leu
            100                 105                 110

Arg Ile Val Glu Ile Gly Asp Glu Asn Ala Thr Leu Asp Gly Thr Asp
        115                 120                 125

Val Leu Phe Thr Gly Arg Glu Phe Phe Val Gly Leu Ser Lys Trp Thr
    130                 135                 140

Asn His Arg Gly Ala Glu Ile Val Ala Asp Thr Phe Arg Asp Phe Ala
145                 150                 155                 160

Val Ser Thr Val Pro Val Ser Gly Pro Ser His Leu Arg Gly Leu Cys
                165                 170                 175

Gly Met Gly Gly Pro Arg Thr Val Val Ala Gly Ser Ser Asp Ala Ala
            180                 185                 190

Gln Lys Ala Val Arg Ala Met Ala Val Leu Thr Asp His Pro Tyr Ala
        195                 200                 205

Ser Leu Thr Leu Pro Asp Asp Ala Ala Ala Asp Cys Leu Phe Leu Arg
    210                 215                 220

Pro Gly Leu Pro Gly Val Pro Pro Phe Leu Leu His Arg Gly Gly Gly
225                 230                 235                 240

Asp Leu Pro Asn Ser Gln Glu Ala Leu Gln Lys Leu Ser Asp Val Thr
                245                 250                 255

Leu Val Pro Val Ser Cys Ser Glu Leu Glu Lys Ala Gly Ala Gly Leu
            260                 265                 270

Ser Ser Leu Cys Leu Val Leu Ser Thr Arg Pro His Ser
        275                 280                 285

<210> SEQ ID NO 3
<211> LENGTH: 1633
<212> TYPE: DNA
<213> ORGANISM: Homo sapiens
<220> FEATURE:
<221> NAME/KEY: misc_feature
<222> LOCATION: (1485)..(1485)
<223> OTHER INFORMATION: n is a, c, g, or t

<400> SEQUENCE: 3
aacttaatgt ttttgcattg gactttgagt taagattatt ttttaaatcc tgaggactag    60

```
cattaattga cagctgaccc aggtgctaca cagaagtgga ttcagtgaat ctaggaagac    120
agcagcagac aggattccag gaaccagtgt ttgatgaagc taggactgag gagcaagcga    180
gcaagcagca gttcgtggaa tcctgtctgc tgctgtcttc ctggtttagg agccgacggg    240
cgctcgcagg ctcagcgcgc gctgcccgcg caggacccg gccgcctccg ccgccgccgc     300
cgcccctaag cctcccgaag ccatggccgg gctcggccac cccgccgcct tcggccgggc    360
cacccacgcc gtggtgcggg cgctacccga gtcgctcggc cagcacgcgc tgagaagcgc    420
caagggcgag gaggtggacg tcgcccgcgc ggaacggcag caccagctct acgtgggcgt    480
gctgggcagc aagctggggc tgcaggtggt ggagctgccg gccgacgaga gccttccgga    540
ctgcgtcttc gtggaggacg tggccgtggt gtgcgaggag acggccctca tcacccgacc    600
cggggcgccg agccggagga aggaggttga catgatgaaa aagcattag aaaaacttca     660 gctcaatata gtagagatga agatgaaaa tgcaacttta gatggcggag atgttttatt    720
cacaggcaga gaattttttg tgggcctttc caaaaggaca aatcaacgag gtgctgaaat    780
cttggctgat acttttaagg actatgcagt ctccacagtg ccagtggcag atgggttgca    840
tttgaagagt ttctgcagca tggctgggcc taacctgatc gcaattgggt ctagtgaatc    900
tgcacagaag gcccttaaga tcatgcaaca gatgagtgac caccgctacg acaaactcac    960
tgtgcctgat gacatagcag caaactgtat atatctaaat atccccaaca aagggcacgt   1020
cttgctgcac cgaaccccgg aagagtatcc agaaagtgca aaggtttatg agaaactgaa   1080
ggaccatatg ctgatccccg tgagcatgtc tgaactggaa aaggtggatg gctgctcac    1140 ctgctgctca gttttaatta caagaaagt agactcctga gctgcagagt ccccccggt    1200 agccggcaag accgcacagg caaggccgat gactctgtgc ccactcctgt tgttttcctt   1260
gacaatctac tgtgccactg tgctactaac tcttgtttac aaaatttgat tctaagttga   1320
attgcttcat tcaacaccc caccctccct ccccrcgagg tggtacctaa gctgtggatt   1380
tgctaaatga attaagcaac ctagaagata cagagctaat gaattatcaa aatgtgatta   1440
atcccagtaa ggaaacactc atttagtgtc tgtatttttg gtgtnaaaat tatttagttg   1500
ccagtatatt ctgaagaatg tcttcttgat cagtcagata agcttgcttt tttttttttt   1560
ttttcatgaa tcatgtttgg ttcctgtgaa agtccctggt ccagggatcc tcctcctttc   1620
tcttttactt ctg                                                      1633

<210> SEQ ID NO 4
<211> LENGTH: 1341
<212> TYPE: DNA
<213> ORGANISM: Homo sapiens

<400> SEQUENCE: 4
ccgcttagac aatgccccgg agccgccaga ccgtcgcgcc cctgccccat cgtagtatat     60
gagctcgcct acacaaggac ccccgctaaa agccagagct cccagtcccc gaggcttgaa   120
gacggggact cccttctcca ccaactctgt cctcgggggg tggggcccca gccgagatca   180
cagcgcgaca ggagtggggg tggccgctgg agacaggtga agaaacaaga aaactaagaa   240
atccgagcgg ttggaggggg agtctgtgtg gatgggatgg ggacgccggg ggaggggctg    300
ggccgctgct cccatgccct gatccgggga gtcccagaga gcctggcgtc gggggaaggt    360 gcggggggctg gccttcccgc tctggatctg gccaaagctc aaagggagca cggggtgctg   420
ggaggtaaac tgaggcaacg actggggcta cagctgctag aactgccacc tgaggagtca   480
```

-continued

```
ttgccgctgg gaccgctgct tggcgacacg gccgtgatcc aaggggacac ggccctaatc      540
acgcggccct ggagccccgc tcgtaggcca gaggtcgatg gagtccgcaa agccctgcaa      600
gacctggggc tccgaattgt ggaaatagga gacgagaacg cgacgctgga tggcactgac      660
gttctcttca ccggccggga gttttcgta ggcctctcca atggaccaa tcaccgagga        720 gctgagatcg tggcggacac gttccgggac ttcgccgtct ccactgtgcc agtctcgggt     780
ccctcccacc tgcgcggtct ctgcggcatg ggggacctc gcactgttgt ggcaggcagc      840
agcgacgctg cccaaaaggc tgtccgggca atggcagtgc tgacagatca cccatatgcc    900
tccctgaccc tcccagatga cgcagctgct gactgcctct tcttcgtcc tgggttgcct     960 ggtgtgcccc ctttcctcct gcaccgtgga ggtgggggatc tgcccaacag ccaggaggca   1020
ctgcagaagc tctctgatgt caccctggta cctgtgtcct gctcagaact ggagaaggct   1080
ggcgccgggc tcagctccct ctgcttggtg ctcagcacac gccccacag ctgagggcct    1140 ggccttgggg tactgctggc caggggtagg atagtatagg aagtagaagg ggaaggaggg    1200
ttagatagag aatgctgaat aggcagtagt tgggagagag cctcaatatt ggggaggggg    1260
agagtgtagg gaaaaggatc cactgggtga atcctccctc tcagaaccaa taaaatagaa    1320
ttgacctttt aaaaaaaaaa a                                              1341
```

<210> SEQ ID NO 5
<211> LENGTH: 182
<212> TYPE: PRT
<213> ORGANISM: Homo sapiens

<400> SEQUENCE: 5

```
Met Met Lys Glu Ala Leu Glu Lys Leu Gln Leu Asn Ile Val Glu Met
1               5                   10                  15

Lys Asp Glu Asn Ala Thr Leu Asp Gly Gly Asp Val Leu Phe Thr Gly
            20                  25                  30

Arg Glu Phe Phe Val Gly Leu Ser Lys Arg Thr Asn Gln Arg Gly Ala
        35                  40                  45

Glu Ile Leu Ala Asp Thr Phe Lys Asp Tyr Ala Val Ser Thr Val Pro
    50                  55                  60

Val Ala Asp Gly Leu His Leu Lys Ser Phe Cys Ser Met Ala Gly Pro
65                  70                  75                  80

Asn Leu Ile Ala Ile Gly Ser Ser Glu Ser Ala Gln Lys Ala Leu Lys
                85                  90                  95

Ile Met Gln Gln Met Ser Asp His Arg Tyr Asp Lys Leu Thr Val Pro
            100                 105                 110

Asp Asp Ile Ala Ala Asn Cys Ile Tyr Leu Asn Ile Pro Asn Lys Gly
        115                 120                 125

His Val Leu Leu His Arg Thr Pro Glu Glu Tyr Pro Glu Ser Ala Lys
    130                 135                 140

Val Tyr Glu Lys Leu Lys Asp His Met Leu Ile Pro Val Ser Met Ser
145                 150                 155                 160

Glu Leu Glu Lys Val Asp Gly Leu Leu Thr Cys Cys Ser Val Leu Ile
                165                 170                 175

Asn Lys Lys Val Asp Ser
            180
```

<210> SEQ ID NO 6
<211> LENGTH: 285
<212> TYPE: PRT
<213> ORGANISM: Bos taurus

<400> SEQUENCE: 6

Met Ala Ser Leu Gly His Pro Ala Thr Phe Gly Arg Ala Thr His Val
1               5                   10                  15

Val Val Arg Ala Leu Pro Glu Ser Leu Ala Gln Gln Ala Leu Arg Arg
            20                  25                  30

Thr Lys Gly Asp Glu Val Asp Phe Ala Arg Ala Glu Arg Gln His Gln
        35                  40                  45

Leu Tyr Val Gly Val Leu Gly Ser Lys Leu Gly Leu Gln Val Val Gln
    50                  55                  60

Leu Pro Ala Asp Glu Ser Leu Pro Asp Cys Val Phe Val Glu Asp Val
65                  70                  75                  80

Ala Val Val Cys Glu Glu Thr Ala Leu Ile Thr Arg Pro Gly Ala Pro
                85                  90                  95

Ser Arg Arg Lys Glu Ala Asp Met Met Lys Glu Ala Leu Glu Lys Leu
            100                 105                 110

Gln Leu Asn Ile Val Glu Met Lys Asp Glu Asn Ala Thr Leu Asp Gly
        115                 120                 125

Gly Asp Val Leu Phe Thr Gly Arg Glu Phe Phe Val Gly Leu Ser Lys
    130                 135                 140

Arg Thr Asn Gln Arg Gly Ala Glu Ile Leu Ala Asp Thr Phe Lys Asp
145                 150                 155                 160

Tyr Ala Val Ser Thr Val Pro Val Val Asp Ala Leu His Leu Lys Ser
                165                 170                 175

Phe Cys Ser Met Ala Gly Pro Asn Leu Ile Ala Ile Gly Ser Ser Glu
            180                 185                 190

Ser Ala Gln Lys Ala Leu Lys Ile Met Gln Gln Met Ser Asp His Arg
        195                 200                 205

Tyr Asp Lys Leu Thr Val Pro Asp Asp Thr Ala Ala Asn Cys Ile Tyr
    210                 215                 220

Leu Asn Ile Pro Ser Lys Gly His Val Leu Leu His Arg Thr Pro Glu
225                 230                 235                 240

Glu Tyr Pro Glu Ser Ala Lys Val Tyr Glu Lys Leu Lys Asp His Met
                245                 250                 255

Leu Ile Pro Val Ser Asn Ser Glu Leu Glu Lys Val Asp Gly Leu Leu
            260                 265                 270

Thr Cys Ser Ser Val Leu Ile Asn Lys Lys Val Asp Ser
        275                 280                 285

<210> SEQ ID NO 7
<211> LENGTH: 285
<212> TYPE: PRT
<213> ORGANISM: Bos taurus

<400> SEQUENCE: 7

Met Gly Thr Pro Gly Glu Gly Leu Gly Arg Cys Ser His Ala Leu Ile
1               5                   10                  15

Arg Gly Val Pro Glu Ser Leu Ala Ser Gly Glu Gly Ala Ala Ala Gly
            20                  25                  30

Leu Pro Ala Leu Asp Leu Ala Lys Ala Gln Arg Glu His Gly Val Leu
        35                  40                  45

Gly Gly Lys Leu Arg Gln Arg Leu Gly Leu Gln Leu Val Glu Leu Pro
    50                  55                  60

Pro Glu Glu Ser Leu Pro Leu Gly Pro Leu Leu Gly Asp Thr Ala Val
65                  70                  75                  80

```
Ile Gln Gly Asp Thr Ala Leu Ile Thr Arg Pro Trp Ser Pro Ala Arg
            85                  90                  95

Arg Pro Glu Val Asp Gly Val Arg Lys Ala Leu Gln Asp Leu Gly Leu
        100                 105                 110

Arg Ile Val Glu Met Gly Asp Glu Asn Ala Thr Leu Asp Gly Thr Asp
    115                 120                 125

Val Leu Phe Thr Gly Arg Glu Phe Val Gly Leu Ser Lys Trp Thr
130                 135                 140

Asn His Arg Gly Ala Glu Ile Val Ala Asp Thr Phe Arg Asp Phe Ala
145                 150                 155                 160

Val Ser Thr Val Pro Val Thr Ser Thr His Leu Arg Gly Leu Cys
                165                 170                 175

Gly Met Gly Gly Pro Arg Thr Val Ala Gly Ser Ser Glu Ala Ala
                180                 185                 190

Gln Lys Ala Val Arg Ala Met Ala Val Leu Thr Asp His Pro Tyr Ala
        195                 200                 205

Ser Leu Thr Leu Pro Asp Asp Ala Ala Asp Cys Leu Phe Leu Arg
    210                 215                 220

Pro Gly Gln Pro Gly Leu Pro Pro Phe Leu Leu His Arg Gly Gly Gly
225                 230                 235                 240

Asp Leu Pro Asn Ser Gln Glu Ala Leu Gln Lys Leu Ser Asp Val Thr
                245                 250                 255

Leu Val Pro Val Ser Cys Ser Glu Leu Glu Lys Ala Gly Ala Gly Leu
            260                 265                 270

Ser Ser Leu Cys Leu Val Leu Ser Thr Arg Pro His Asn
        275                 280                 285

<210> SEQ ID NO 8
<211> LENGTH: 858
<212> TYPE: DNA
<213> ORGANISM: Bos taurus

<400> SEQUENCE: 8
atggcttctc tcggccaccc agccaccttt ggccgggcca cccatgtcgt ggtacgggcg      60
ctgcccgagt ccctcgccca acaggcgctg aggcgcacca agggcgacga ggtggatttc     120
gcccgcgctg agcggcagca ccagctctac gtgggcgtgc tgggcagtaa actgggctg     180 caggtggtgc agctgcccgc cgacgagagc ctcccagact gcgtgttcgt ggaggacgtg     240
gccgtggtgt gcgaggagac ggccctgatc acccgccccg gggcgccgag ccggaggaag     300
gaggctgaca tgatgaaaga agcactagaa aaacttcagc tcaacatagt agagatgaaa     360
gatgaaaatg caactttaga tggtggagat gtcttattca caggcagaga atttttgtg      420 ggcctttcca aaaggacaaa tcaacgaggt gcggaaatct ggctgatac ttttaaggac      480 tatgcggtct ccacggtccc tgtggtggat gctttgcact tgaagagttt ctgcagcatg     540
gctgggccta acctaatcgc tattggatcc agtgaatctg cacagaaggc cctcaagatc     600
atgcaacaga tgagtgatca tcgctacgac aaactcacag tgcctgatga cacggccgca     660
aactgcatat acctgaatat ccccagcaaa ggccacgtct tgctgcaccg aaccccagaa     720
gagtacccag agagtgcaaa ggtttatgaa aagctgaagg accatatgct gatcccgtg      780 agcaattctg aactgaaaa ggtggacggg ctgctcacct gcagctcggt tttaattaac     840
aagaaagtag actcctga                                                   858
```

```
<210> SEQ ID NO 9
<211> LENGTH: 285
<212> TYPE: PRT
<213> ORGANISM: Mus musculus

<400> SEQUENCE: 9

Met Ala Gly Leu Gly His Pro Ser Ala Phe Gly Arg Ala Thr His Ala
1               5                   10                  15

Val Val Arg Ala Pro Pro Glu Ser Leu Cys Arg His Ala Leu Arg Arg
            20                  25                  30

Ser Gln Gly Glu Glu Val Asp Phe Ala Arg Ala Glu Arg Gln His Glu
        35                  40                  45

Leu Tyr Val Gly Val Leu Gly Ser Lys Leu Gly Leu Gln Val Val Gln
    50                  55                  60

Leu Pro Ala Asp Glu Ser Leu Pro Asp Cys Val Phe Val Glu Asp Val
65                  70                  75                  80

Ala Val Val Cys Glu Glu Thr Ala Leu Ile Thr Arg Pro Gly Ala Pro
                85                  90                  95

Ser Arg Arg Lys Glu Val Asp Met Met Lys Glu Ala Leu Glu Lys Leu
            100                 105                 110

Gln Leu Asn Ile Val Glu Met Lys Asp Glu Asn Ala Thr Leu Asp Gly
        115                 120                 125

Gly Asp Val Leu Phe Thr Gly Arg Glu Phe Phe Val Gly Leu Ser Lys
    130                 135                 140

Arg Thr Asn Gln Arg Gly Ala Glu Ile Leu Ala Asp Thr Phe Lys Asp
145                 150                 155                 160

Tyr Ala Val Ser Thr Val Pro Val Ala Asp Ser Leu His Leu Lys Ser
                165                 170                 175

Phe Cys Ser Met Ala Gly Pro Asn Leu Ile Ala Ile Gly Ser Ser Glu
            180                 185                 190

Ser Ala Gln Lys Ala Leu Lys Ile Met Gln Gln Met Ser Asp His Arg
        195                 200                 205

Tyr Asp Lys Leu Thr Val Pro Asp Asp Met Ala Ala Asn Cys Ile Tyr
    210                 215                 220

Leu Asn Ile Pro Ser Lys Gly His Val Leu Leu His Arg Thr Pro Glu
225                 230                 235                 240

Glu Tyr Pro Glu Ser Ala Lys Val Tyr Glu Lys Leu Lys Asp His Leu
                245                 250                 255

Leu Ile Pro Val Ser Asn Ser Glu Met Glu Lys Val Asp Gly Leu Leu
            260                 265                 270

Thr Cys Cys Ser Val Phe Ile Asn Lys Lys Ile Asp Ser
        275                 280                 285

<210> SEQ ID NO 10
<211> LENGTH: 285
<212> TYPE: PRT
<213> ORGANISM: Mus musculus

<400> SEQUENCE: 10

Met Gly Thr Pro Gly Glu Gly Leu Gly Arg Cys Ser His Ala Leu Ile
1               5                   10                  15

Arg Gly Val Pro Glu Ser Leu Ala Ser Gly Glu Gly Ala Gly Ala Gly
            20                  25                  30

Leu Pro Ala Leu Asp Leu Ala Lys Ala Gln Arg Glu His Gly Val Leu
        35                  40                  45

Gly Gly Lys Leu Arg Gln Arg Leu Gly Leu Gln Leu Leu Glu Leu Pro
```

```
         50                  55                  60
Pro Glu Glu Ser Leu Pro Leu Gly Pro Leu Leu Gly Asp Thr Ala Val
65                  70                  75                  80

Ile Gln Gly Asp Thr Ala Leu Ile Thr Arg Pro Trp Ser Pro Ala Arg
                85                  90                  95

Arg Pro Glu Val Asp Gly Val Arg Lys Ala Leu Gln Asp Leu Gly Leu
            100                 105                 110

Arg Ile Val Glu Met Gly Asp Glu Asn Ala Thr Leu Asp Gly Thr Asp
            115                 120                 125

Val Leu Phe Thr Gly Arg Glu Phe Val Gly Leu Ser Lys Trp Thr
        130                 135                 140

Asn His Arg Gly Ala Glu Ile Val Ala Asp Thr Phe Arg Asp Phe Ala
145                 150                 155                 160

Val Ser Thr Val Pro Val Ser Gly Ser Ser His Leu Arg Gly Leu Cys
                165                 170                 175

Gly Met Gly Gly Pro Arg Thr Val Val Ala Gly Ser Ser Glu Ala Ala
            180                 185                 190

Gln Lys Ala Val Arg Ala Met Ala Leu Thr Asp His Pro Tyr Ala
        195                 200                 205

Ser Leu Thr Leu Pro Asp Asp Ala Ser Asp Cys Leu Phe Leu Arg
    210                 215                 220

Pro Gly Leu Pro Gly Ala Thr Pro Phe Leu Leu His Arg Gly Gly Gly
225                 230                 235                 240

Asp Leu Pro Asn Ser Gln Glu Ala Leu Gln Lys Leu Ser Asp Val Thr
                245                 250                 255

Leu Val Pro Val Ser Cys Ser Glu Leu Glu Lys Ala Gly Ala Gly Leu
            260                 265                 270

Ser Ser Leu Cys Leu Val Leu Ser Thr Arg Pro His Cys
        275                 280                 285

<210> SEQ ID NO 11
<211> LENGTH: 285
<212> TYPE: PRT
<213> ORGANISM: Rattus norvegicus

<400> SEQUENCE: 11

Met Ala Gly Leu Ser His Pro Ser Val Phe Gly Arg Ala Thr His Ala
1               5                   10                  15

Val Val Arg Ala Pro Pro Glu Ser Leu Cys Arg His Ala Leu Arg Arg
            20                  25                  30

Ser Gln Gly Glu Glu Val Asp Phe Ala Arg Ala Glu Arg Gln His Gln
        35                  40                  45

Leu Tyr Val Gly Val Leu Gly Ser Lys Leu Gly Leu Gln Val Val Gln
    50                  55                  60

Leu Pro Ala Asp Glu Ser Leu Pro Asp Cys Val Phe Val Glu Asp Val
65                  70                  75                  80

Ala Val Val Cys Glu Glu Thr Ala Leu Ile Thr Arg Pro Gly Ala Pro
                85                  90                  95

Ser Arg Arg Lys Glu Val Asp Met Met Lys Glu Ala Leu Glu Lys Leu
            100                 105                 110

Gln Leu Asn Ile Val Glu Met Lys Asp Glu Asn Ala Thr Leu Asp Gly
        115                 120                 125

Gly Asp Val Leu Phe Thr Gly Arg Glu Phe Phe Val Gly Leu Ser Lys
    130                 135                 140
```

```
Arg Thr Asn Gln Arg Gly Ala Glu Ile Leu Ala Asp Thr Phe Lys Asp
145                 150                 155                 160

Tyr Ala Val Ser Thr Val Pro Val Ala Asp Ser Leu His Leu Lys Ser
                165                 170                 175

Phe Cys Ser Met Ala Gly Pro Asn Leu Ile Ala Ile Gly Ser Ser Glu
                180                 185                 190

Ser Ala Gln Lys Ala Leu Lys Ile Met Gln Gln Met Ser Asp His Arg
                195                 200                 205

Tyr Asp Lys Leu Thr Val Pro Asp Asp Met Ala Ala Asn Cys Ile Tyr
                210                 215                 220

Leu Asn Ile Pro Ser Lys Gly His Val Leu Leu His Arg Thr Pro Glu
225                 230                 235                 240

Glu Tyr Pro Glu Ser Ala Lys Val Tyr Glu Lys Leu Lys Asp His Leu
                245                 250                 255

Leu Ile Pro Val Ser Asn Ser Glu Met Glu Lys Val Asp Gly Leu Leu
                260                 265                 270

Thr Cys Cys Ser Val Phe Ile Asn Lys Lys Thr Asp Ser
                275                 280                 285

<210> SEQ ID NO 12
<211> LENGTH: 285
<212> TYPE: PRT
<213> ORGANISM: Rattus norvegicus

<400> SEQUENCE: 12

Met Gly Thr Pro Gly Glu Gly Leu Gly Arg Cys Ser His Ala Leu Ile
1               5                   10                  15

Arg Gly Val Pro Glu Ser Leu Ala Ser Gly Glu Gly Ala Gly Ala Gly
                20                  25                  30

Leu Pro Ala Leu Asp Leu Ala Lys Ala Gln Arg Glu His Gly Val Leu
                35                  40                  45

Gly Gly Lys Leu Arg Gln Arg Leu Gly Leu Gln Leu Leu Glu Leu Pro
        50                  55                  60

Pro Glu Glu Ser Leu Pro Leu Gly Pro Leu Leu Gly Asp Thr Ala Val
65              70                  75                  80

Ile Gln Gly Asp Thr Ala Leu Ile Thr Arg Pro Trp Ser Pro Ala Arg
                85                  90                  95

Arg Pro Glu Val Asp Gly Val Arg Lys Ala Leu Gln Asp Leu Gly Leu
                100                 105                 110

Arg Ile Val Glu Met Gly Asp Glu Asn Ala Thr Leu Asp Gly Thr Asp
                115                 120                 125

Val Leu Phe Thr Gly Arg Glu Phe Phe Val Gly Leu Ser Lys Trp Thr
130                 135                 140

Asn His Arg Gly Ala Glu Ile Val Ala Asp Thr Phe Arg Asp Phe Ala
145                 150                 155                 160

Val Ser Thr Val Pro Val Ser Gly Ala Ser His Leu Arg Gly Leu Cys
                165                 170                 175

Gly Met Gly Gly Pro Arg Thr Val Val Ala Gly Ser Ser Glu Ala Ala
                180                 185                 190

Gln Lys Ala Val Arg Ala Met Ala Ala Leu Thr Asp His Pro Tyr Ala
                195                 200                 205

Ser Leu Thr Leu Pro Asp Asp Ala Ala Ser Asp Cys Leu Phe Leu Arg
                210                 215                 220

Pro Gly Leu Pro Gly Thr Thr Pro Phe Leu Leu His Arg Gly Gly Gly
225                 230                 235                 240
```

```
Asp Leu Pro Asn Ser Gln Glu Ala Leu Gln Lys Leu Ser Asp Val Thr
            245                 250                 255

Leu Val Pro Val Ser Cys Ser Glu Leu Glu Lys Val Gly Ala Gly Leu
            260                 265                 270

Ser Ser Leu Cys Leu Val Leu Ser Thr Arg Pro His Cys
            275                 280                 285

<210> SEQ ID NO 13
<211> LENGTH: 254
<212> TYPE: PRT
<213> ORGANISM: Pseudomonas aeruginosa

<400> SEQUENCE: 13

Met Phe Lys His Ile Ile Ala Arg Thr Pro Ala Arg Ser Leu Val Asp
1               5                   10                  15

Gly Leu Thr Ser Ser His Leu Gly Lys Pro Asp Tyr Ala Lys Ala Leu
            20                  25                  30

Glu Gln His Asn Ala Tyr Ile Arg Ala Leu Gln Thr Cys Asp Val Asp
        35                  40                  45

Ile Thr Leu Leu Pro Pro Asp Glu Arg Phe Pro Asp Ser Val Phe Val
    50                  55                  60

Glu Asp Pro Val Leu Cys Thr Ser Arg Cys Ala Ile Ile Thr Arg Pro
65                  70                  75                  80

Gly Ala Glu Ser Arg Arg Gly Glu Thr Glu Ile Ile Glu Glu Thr Val
                85                  90                  95

Gln Arg Phe Tyr Pro Gly Lys Val Glu Arg Ile Glu Ala Pro Gly Thr
            100                 105                 110

Val Glu Ala Gly Asp Ile Met Met Val Gly Asp His Phe Tyr Ile Gly
        115                 120                 125

Glu Ser Ala Arg Thr Asn Ala Glu Gly Ala Arg Gln Met Ile Ala Ile
    130                 135                 140

Leu Glu Lys His Gly Leu Ser Gly Ser Val Val Arg Leu Glu Lys Val
145                 150                 155                 160

Leu His Leu Lys Thr Gly Leu Ala Tyr Leu Glu His Asn Asn Leu Leu
                165                 170                 175

Ala Ala Gly Glu Phe Val Ser Lys Pro Glu Phe Gln Asp Phe Asn Ile
            180                 185                 190

Ile Glu Ile Pro Glu Glu Ser Tyr Ala Ala Asn Cys Ile Trp Val
        195                 200                 205

Asn Glu Arg Val Ile Met Pro Ala Gly Tyr Pro Arg Thr Arg Glu Lys
    210                 215                 220

Ile Ala Arg Leu Gly Tyr Arg Val Ile Glu Val Asp Thr Ser Glu Tyr
225                 230                 235                 240

Arg Lys Ile Asp Gly Gly Val Ser Cys Met Ser Leu Arg Phe
                245                 250

<210> SEQ ID NO 14
<211> LENGTH: 285
<212> TYPE: PRT
<213> ORGANISM: Macaca mulatta

<400> SEQUENCE: 14

Met Ala Gly Leu Gly His Pro Ala Ala Phe Gly Arg Ala Thr His Ala
1               5                   10                  15

Val Val Arg Ala Leu Pro Glu Ser Leu Gly Gln His Ala Leu Arg Ser
            20                  25                  30
```

-continued

```
Ala Lys Gly Glu Glu Val Asp Val Ala Arg Ala Glu Arg Gln His Gln
        35                  40                  45
Leu Tyr Val Gly Val Leu Gly Ser Lys Leu Gly Leu Gln Val Val Glu
        50                  55                  60
Leu Pro Ala Asp Glu Ser Leu Pro Asp Cys Val Phe Val Glu Asp Val
65                  70                  75                  80
Ala Val Val Cys Glu Glu Thr Ala Leu Ile Thr Arg Pro Gly Ala Pro
                85                  90                  95
Ser Arg Arg Lys Glu Val Asp Met Met Lys Glu Ala Leu Glu Lys Leu
                100                 105                 110
Gln Leu Asn Ile Val Glu Met Lys Asp Glu Asn Ala Thr Leu Asp Gly
            115                 120                 125
Gly Asp Val Leu Phe Thr Gly Arg Glu Phe Phe Val Gly Leu Ser Lys
            130                 135                 140
Arg Thr Asn Gln Arg Gly Ala Glu Ile Leu Ala Asp Thr Phe Lys Asp
145                 150                 155                 160
Tyr Ala Val Ser Thr Val Pro Val Ala Asp Gly Leu His Leu Lys Ser
                165                 170                 175
Phe Cys Ser Met Ala Gly Pro Asn Leu Ile Ala Ile Gly Ser Ser Glu
                180                 185                 190
Ser Ala Gln Lys Ala Leu Lys Ile Met Gln Gln Met Ser Asp His Arg
                195                 200                 205
Tyr Asp Lys Leu Thr Val Pro Asp Asp Ile Ala Ala Asn Cys Ile Tyr
        210                 215                 220
Leu Asn Ile Pro Asn Lys Gly His Val Leu Leu His Arg Thr Pro Glu
225                 230                 235                 240
Glu Tyr Pro Glu Ser Ala Lys Val Tyr Glu Lys Leu Lys Asp His Met
                245                 250                 255
Leu Ile Pro Val Ser Met Ser Glu Leu Glu Lys Val Asp Gly Leu Leu
            260                 265                 270
Thr Cys Cys Ser Val Leu Ile Asn Lys Lys Val Asp Ser
        275                 280                 285
```